(12) United States Patent
Kim et al.

(10) Patent No.: US 8,379,600 B2
(45) Date of Patent: Feb. 19, 2013

(54) METHOD FOR RESOURCE ALLOCATION IN WIRELESS COMMUNICATION SYSTEM

(75) Inventors: Keun Young Kim, Seongnam-si (KR); Byung-Han Ryu, Daejeon (KR); Seung Chan Bang, Daejeon (KR)

(73) Assignees: Electronics and Telecommunications Research Institute, Daejeon (KR); KT Corporation, Kyeonggi-Do (KR)

( * ) Notice: Subject to any disclaimer, the term of this patent is extended or adjusted under 35 U.S.C. 154(b) by 244 days.

(21) Appl. No.: 12/745,723

(22) PCT Filed: Dec. 2, 2008

(86) PCT No.: PCT/KR2008/007111
§ 371 (c)(1),
(2), (4) Date: Jun. 2, 2010

(87) PCT Pub. No.: WO2009/072792
PCT Pub. Date: Jun. 11, 2009

(65) Prior Publication Data
US 2010/0246706 A1    Sep. 30, 2010

(30) Foreign Application Priority Data
Dec. 3, 2007    (KR) .................. 10-2007-0124590

(51) Int. Cl.
G01R 31/08    (2006.01)
H04W 4/00    (2009.01)
H04J 3/16    (2006.01)

(52) U.S. Cl. ......... 370/332; 370/252; 370/329; 370/470

(58) Field of Classification Search .................. None
See application file for complete search history.

(56) References Cited

U.S. PATENT DOCUMENTS

| | | | |
|---|---|---|---|
| 7,065,060 | B2 | 6/2006 | Yun et al. |
| 2003/0123559 | A1 | 7/2003 | Classon et al. |
| 2005/0053035 | A1 | 3/2005 | Kwak et al. |
| 2007/0177553 | A1 | 8/2007 | Frederiksen et al. |
| 2007/0242636 | A1 | 10/2007 | Kashima et al. |
| 2007/0254603 | A1 | 11/2007 | Li et al. |
| 2007/0258373 | A1 | 11/2007 | Frederiksen et al. |
| 2009/0161641 | A1* | 6/2009 | Kim .............................. 370/338 |
| 2009/0185638 | A1* | 7/2009 | Imamura et al. ............... 375/298 |
| 2011/0281605 | A1* | 11/2011 | Shiizaki et al. ................ 455/509 |

FOREIGN PATENT DOCUMENTS

| | | |
|---|---|---|
| JP | 2007-282021 | 10/2007 |
| KR | 10-2001-0114181 | 12/2001 |
| KR | 10-2005-0017601 | 2/2005 |
| WO | WO 2007136002 A1 * | 11/2007 |

OTHER PUBLICATIONS

International Search Report for PCT/KR2008/007111, mailed on Mar. 30, 2009.

* cited by examiner

*Primary Examiner* — Kwang B Yao
*Assistant Examiner* — Jutai Kao
(74) *Attorney, Agent, or Firm* — Staas & Halsey LLP

(57) ABSTRACT

The present invention provides a method for resource allocation in a wireless communication system. In the method for resource allocation, a scheduler of a base station decides on a modulation scheme and an encoding scheme according to channel quality information (CQI), and decides on a number of allocated resource blocks according to transmission data size referring to a table of resource block allocation. The table of resource block allocation presents a number of allocated resource blocks and a number of transmission bits according to the number of allocated resource blocks.

9 Claims, 3 Drawing Sheets

METHOD FOR RESOURCE ALLOCATION IN WIRELESS COMMUNICATION SYSTEM

CROSS REFERENCE TO RELATED APPLICATIONS

This application claims the benefit under 35 U.S.C. Section 371, of PCT International Application No. PCT/KR2008/007111, filed Dec. 2, 2008, which claimed priority to Korean Application No. 10-2007-0124590, filed Dec. 3, 2007, the entire disclosures of which are incorporated by reference as a part of this application.

TECHNICAL FIELD

The present invention relates to a method for resource allocation in a wireless communication system. More particularly, the present invention relates to a method for deciding a number of allocated resource blocks and size of allocated transmission blocks according to a modulation scheme and an encoding scheme in a wireless communication system.

This work was supported by the IT R&D program of MIC/IITA [2005-S-404-13, Research & Development of Radio Transmission Technology for 3G evolution].

BACKGROUND ART

The 3rd Generation Partnership Project Long Term Evolution (3GPP LTE) system is an orthogonal frequency-division multiplexing (OFDM)-based system that has a different resource structure from that of existing wireless communication systems.

WiBro and WiMAX systems are OFDM-based systems, but their methods of structuring resource blocks are different from that of 3GPP LTE.

In the case of WCDMA, the document for deciding size of a transmission block is in 25.321, which is 3GPP standard specification.

However, there is a problem in that a method for deciding a number of allocated resource blocks and size of allocated transmission blocks is not determined.

Technical Problem

The present invention has been made in an effort to provide a method for deciding a number of allocated resource blocks and size of allocated transmission blocks according to a modulation scheme and an encoding scheme in a wireless communication system.

Technical Solution

An exemplary embodiment of the present invention provides a method for resource allocation of a scheduler of a base station in a wireless communication system including: deciding on a modulation scheme and an encoding scheme according to channel quality information (CQI); and deciding on a number of allocated resource blocks according to transmission data size referring to a table of resource block allocation, wherein the table of resource block allocation presents a number of allocated resource blocks and a number of transmission bits according to the number of allocated resource blocks.

Another embodiment of the invention provides a method for downlink resource allocation of a base station in a wireless communication system, including: deciding on a modulation scheme and an encoding scheme according to channel quality information (CQI) of a downlink; and deciding on a number of allocated resource blocks according to size of transmission data referring to a table of downlink resource block allocation, wherein the table of downlink resource block allocation presents a number of allocated downlink resource blocks and a number of transmission bits according to the number of allocated downlink resource blocks.

Another embodiment of the invention provides a method for uplink resource allocation of a base station in a wireless communication system, including: deciding on a modulation scheme and an encoding scheme according to channel quality information (CQI) of an uplink; and deciding on a number of allocated resource blocks according to size of transmission data referring to a table of uplink resource block allocation, wherein the table of uplink resource block allocation presents a number of allocated uplink resource blocks and a number of transmission bits according to the number of allocated uplink resource blocks.

ADVANTAGEOUS EFFECTS

According to the embodiments of the present invention, a suitable modulation scheme and a suitable encoding scheme are selected according to channel environment, in which a standard error rate can be satisfied. Further, a number of allocated resource blocks and a number of transmitted bits according to a modulation scheme and an encoding scheme are presented, which provides a method for deciding on a number of allocated resource blocks and size of the allocated transmission blocks.

BEST MODE

Figure 1:
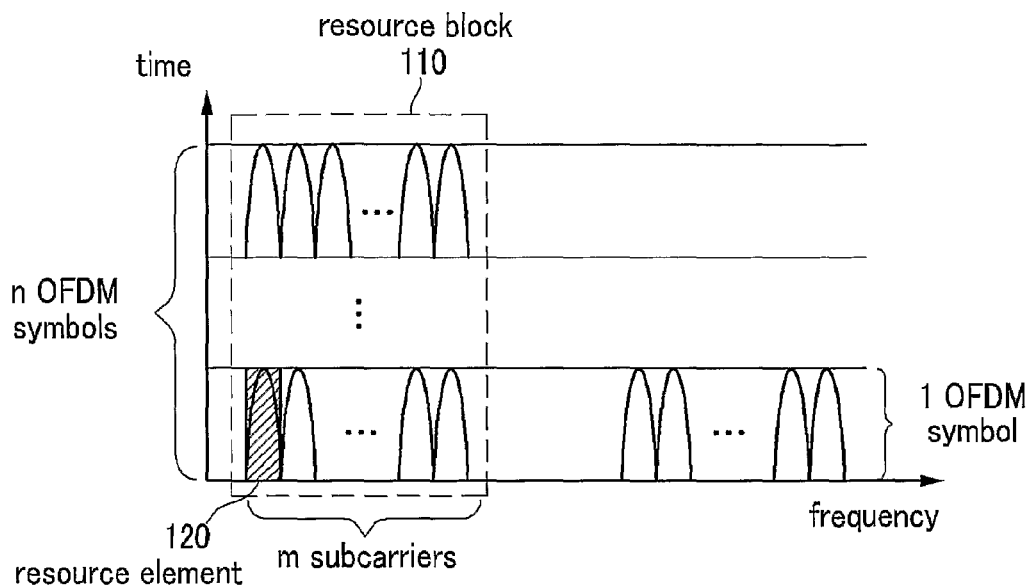
FIG. 1 is a schematic diagram of resource blocks, which are a basic unit of data transmission in a method for resource allocation, according to an exemplary embodiment of the present invention.

In the following detailed description, only certain exemplary embodiments of the present invention have been shown and described, simply by way of illustration.

As those skilled in the art would realize, the described embodiments may be modified in various different ways, all without departing from the spirit or scope of the present invention.

Accordingly, the drawings and description are to be regarded as illustrative in nature and not restrictive.

Like reference numerals designate like elements throughout the specification.

Throughout this specification and the claims that follow, unless explicitly described to the contrary, the word "comprise", and variations such as "comprises" or "comprising", will be understood to imply the inclusion of stated elements but not the exclusion of any other elements.

Also, the terms of a unit, a device, and a module in the present specification represent a unit for processing a predetermined function or operation, which can be realized by hardware, software, or a combination of hardware and software.

A method for resource allocation in a wireless communication system according to an exemplary embodiment of the present invention will now be described.

A table of resource block allocation and a table of transmission block size, which are used when a number of allocated resource blocks and a size of transmission block are decided on in a method for resource allocation in a wireless communication system according to an exemplary embodiment of the present invention, will be described.

FIG. 1 is a schematic diagram of resource blocks, which are a basic unit of data transmission in a method for resource allocation, according to an exemplary embodiment of the present invention.

As shown in FIG. 1, a resource block 110 includes a plurality of resource elements 120.

A resource element 120 is an area formed with a subcarrier and an OFDM symbol.

In FIG. 1, a resource block 110 comprises nm resource elements.

A number of resource elements used for data transmission among resource elements 120 included in a resource block 110 is decided on according to a form of a subframe. Generally, the number of resource elements used for data transmission is 120 or 72 in downlink and 144 or 132 in uplink.

That is, a number of resource elements used for data transmission among resource elements 120 included in a resource block 110 is decided on according to a number of resource elements used for control.

The number of resource blocks changes with frequency bandwidth. That is, it is 100 in 20 MHz, 50 in 10 MHz, 25 in 5 MHz, and 6 in 1.25 MHz.

In the case that a number of resource elements used for data transmission among resource elements 120 included in a resource block 110 is 120, a number of bits transmitted with a resource block according to modulation scheme and encoding scheme is as in Table 1.

TABLE 1

| Modulation Scheme | Encoding Rate | A number of bits transmitted with a resource block |
|---|---|---|
| QPSK | 1/9 | 26 2/3 |
|  | 1/6 | 40 |
|  | 1/3 | 80 |
|  | 1/2 | 120 |
| 16QAM | 1/3 | 160 |
|  | 1/2 | 240 |
|  | 2/3 | 320 |
| 64QAM | 1/2 | 360 |
|  | 2/3 | 480 |
|  | 4/5 | 576 |

In Table 1, the number of bits transmitted with a resource block is a number of resource elements used for data transmission per resource block multiplied by a modulation rate and an encoding rate.

The modulation rate is 2 in QPSK, 4 in 16QAM, and 6 in 64QAM.

For example, in the case that a number of resource elements used for data transmission per resource block is 120, the modulation scheme is QPSK and the encoding rate is 1/6, the number of transmission bits is 120*2*1/6=40.

A table of resource block allocation presents a number of transmission bits according to a number of allocated resource blocks and exists for each pair of a modulation scheme and an encoding scheme.

The number of transmission bits according to the number of allocated resource blocks is a number of resource elements used for data transmission per resource block multiplied by a modulation rate, an encoding rate, and a number of allocated resource blocks.

Further, the number of transmission bits must satisfy a condition.

That is, if the number of transmission bits is not less than 40 bits and not more than 512, bits it should be a multiple of 8. If the number of transmission bits is more than 512 bits and not more than 1024 bits, it should be a multiple of 16. If the number of transmission bits is more than 1024 bits and not more than 2048 bits, it should be a multiple of 32. If the number of transmission bits is more than 2048 bits and not more than 6144 bits, it should be a multiple of 64.

In an exemplary embodiment of the present invention, cases in which a pairs of a modulation scheme and an encoding scheme are QPSK 1/9, QPSK 1/6, QPSK 1/3, QPSK 1/2, QPSK 2/3, QPSK 3/4, QPSK 4/5, 16QAM 1/3, 16QAM 1/2, 16QAM 2/3, 16QAM 3/4, 16QAM 4/5, 64QAM 1/3, 64QAM 1/2, 64QAM 2/3, 64QAM 3/4, and 64QAM 4/5 are described, but the invention is not limited to these cases.

As described above, the number of resource blocks changes with frequency bandwidth, as 100, 50, 25, 6, and so on. The maximum number of resource blocks is 100, so a table for a case in which the number of resource blocks is 100 can be used in all cases.

In an exemplary embodiment of the present invention, downlink tables of resource block allocation in cases in which the numbers of resource elements used for data transmission per resource block are 120 and 72 are presented. For uplink, tables of resource block allocation in cases in which the numbers of resource elements used for data transmission per resource block are 144 and 132 are presented.

Tables 2 to 18 present resource block allocation for each pair of a modulation scheme and an encoding scheme in a case in which the number of resource elements for downlink used for data transmission per resource block is 120.

First, Table 2 presents resource block allocation for a case in which the modulation scheme is QPSK, the encoding rate is 1/9, and the number of resource elements used for data transmission per resource block is 120.

TABLE 2

| A number of allocated resource blocks | A number of transmission bits |
|---|---|
| 3 | 80 |
| 6 | 160 |
| 9 | 240 |
| 12 | 320 |
| 15 | 400 |
| 18 | 480 |
| 21 | 560 |
| 24 | 640 |
| 27 | 720 |
| 30 | 800 |
| 33 | 880 |
| 36 | 960 |
| 42 | 1120 |
| 48 | 1280 |
| 54 | 1440 |
| 60 | 1600 |
| 66 | 1760 |

TABLE 2-continued

| A number of allocated resource blocks | A number of transmission bits |
|---|---|
| 72 | 1920 |
| 84 | 2240 |
| 96 | 2560 |

Table 3 presents resource block allocation for a case in which the modulation scheme is QPSK, the encoding rate is ⅙, and the number of resource elements used for data transmission per resource block is 120.

TABLE 3

| A number of allocated resource blocks | A number of transmission bits |
|---|---|
| 1 | 40 |
| 2 | 80 |
| 3 | 120 |
| 4 | 160 |
| 5 | 200 |
| 6 | 240 |
| 7 | 280 |
| 8 | 320 |
| 9 | 360 |
| 10 | 400 |
| 11 | 440 |
| 12 | 480 |
| 14 | 560 |
| 16 | 640 |
| 18 | 720 |
| 20 | 800 |
| 22 | 880 |
| 24 | 960 |
| 28 | 1120 |
| 32 | 1280 |
| 36 | 1440 |
| 40 | 1600 |
| 44 | 1760 |
| 48 | 1920 |
| 56 | 2240 |
| 64 | 2560 |
| 72 | 2880 |
| 80 | 3200 |
| 88 | 3520 |
| 96 | 3840 |

Table 4 presents resource block allocation for a case in which the modulation scheme is QPSK, the encoding rate is ⅓, and the number of resource elements used for data transmission per resource block is 120.

TABLE 4

| A number of allocated resource blocks | A number of transmission bits |
|---|---|
| 1 | 80 |
| 2 | 160 |
| 3 | 240 |
| 4 | 320 |
| 5 | 400 |
| 6 | 480 |
| 7 | 560 |
| 8 | 640 |
| 9 | 720 |
| 10 | 800 |
| 11 | 880 |
| 12 | 960 |
| 14 | 1120 |
| 16 | 1280 |
| 18 | 1440 |
| 20 | 1600 |
| 22 | 1760 |
| 24 | 1920 |
| 28 | 2240 |
| 32 | 2560 |

TABLE 4-continued

| A number of allocated resource blocks | A number of transmission bits |
|---|---|
| 36 | 2880 |
| 40 | 3200 |
| 44 | 3520 |
| 48 | 3840 |
| 52 | 4160 |
| 56 | 4480 |
| 60 | 4800 |
| 64 | 5120 |
| 68 | 5440 |
| 72 | 5760 |
| 76 | 6080 |
| 80 | 6400 |
| 84 | 6720 |
| 88 | 7040 |
| 92 | 7360 |
| 96 | 7680 |
| 100 | 8000 |

Table 5 presents resource block allocation for a case in which the modulation scheme is QPSK, the encoding rate is ½, and the number of resource elements used for data transmission per resource block is 120.

TABLE 5

| A number of allocated resource blocks | A number of transmission bits |
|---|---|
| 1 | 120 |
| 2 | 240 |
| 3 | 360 |
| 4 | 480 |
| 6 | 720 |
| 8 | 960 |
| 12 | 1440 |
| 16 | 1920 |
| 24 | 2880 |
| 32 | 3840 |
| 40 | 4800 |
| 48 | 5760 |
| 56 | 6720 |
| 64 | 7680 |
| 72 | 8640 |
| 80 | 9600 |
| 88 | 10560 |
| 96 | 11520 |

Table 6 presents resource block allocation for a case in which the modulation scheme is QPSK, the encoding rate is ⅔, and the number of resource elements used for data transmission per resource block is 120.

TABLE 6

| A number of allocated resource blocks | A number of transmission bits |
|---|---|
| 1 | 160 |
| 2 | 320 |
| 3 | 480 |
| 4 | 640 |
| 5 | 800 |
| 6 | 960 |
| 7 | 1120 |
| 8 | 1280 |
| 9 | 1440 |
| 10 | 1600 |
| 11 | 1760 |
| 12 | 1920 |
| 14 | 2240 |
| 16 | 2560 |
| 18 | 2880 |
| 20 | 3200 |
| 22 | 3520 |
| 24 | 3840 |

TABLE 6-continued

| A number of allocated resource blocks | A number of transmission bits |
|---|---|
| 26 | 4160 |
| 28 | 4480 |
| 30 | 4800 |
| 32 | 5120 |
| 34 | 5440 |
| 36 | 5760 |
| 38 | 6080 |
| 40 | 6400 |
| 42 | 6720 |
| 44 | 7040 |
| 46 | 7360 |
| 48 | 7680 |
| 50 | 8000 |
| 52 | 8320 |
| 54 | 8640 |
| 56 | 8960 |
| 58 | 9280 |
| 60 | 9600 |
| 62 | 9920 |
| 64 | 10240 |
| 66 | 10560 |
| 68 | 10880 |
| 70 | 11200 |
| 72 | 11520 |
| 74 | 11840 |
| 76 | 12160 |
| 78 | 12480 |
| 80 | 12800 |
| 82 | 13120 |
| 84 | 13440 |
| 86 | 13760 |
| 88 | 14080 |
| 90 | 14400 |
| 92 | 14720 |
| 94 | 15040 |
| 96 | 15360 |
| 98 | 15680 |
| 100 | 16000 |

Table 7 presents resource block allocation for a case in which the modulation scheme is QPSK, the encoding rate is ¾, and the number of resource elements used for data transmission per resource block is 120.

TABLE 7

| A number of allocated resource blocks | A number of transmission bits |
|---|---|
| 2 | 360 |
| 4 | 720 |
| 8 | 1440 |
| 16 | 2880 |
| 32 | 5760 |
| 48 | 8640 |
| 64 | 11520 |
| 80 | 14400 |
| 96 | 17280 |

Table 8 presents resource block allocation for a case in which the modulation scheme is QPSK, the encoding rate is ⅘, and the number of resource elements used for data transmission per resource block is 120.

TABLE 8

| A number of allocated resource blocks | A number of transmission bits |
|---|---|
| 1 | 192 |
| 2 | 384 |
| 3 | 576 |
| 4 | 768 |
| 5 | 960 |
| 6 | 1152 |

TABLE 8-continued

| A number of allocated resource blocks | A number of transmission bits |
|---|---|
| 7 | 1344 |
| 8 | 1536 |
| 9 | 1728 |
| 10 | 1920 |
| 11 | 2112 |
| 12 | 2304 |
| 13 | 2496 |
| 14 | 2688 |
| 15 | 2880 |
| 16 | 3072 |
| 17 | 3264 |
| 18 | 3456 |
| 19 | 3648 |
| 20 | 3840 |
| 21 | 4032 |
| 22 | 4224 |
| 23 | 4416 |
| 24 | 4608 |
| 25 | 4800 |
| 26 | 4992 |
| 27 | 5184 |
| 28 | 5376 |
| 29 | 5568 |
| 30 | 5760 |
| 31 | 5952 |
| 32 | 6144 |
| 33 | 6336 |
| 34 | 6528 |
| 35 | 6720 |
| 36 | 6912 |
| 37 | 7104 |
| 38 | 7296 |
| 39 | 7488 |
| 40 | 7680 |
| 41 | 7872 |
| 42 | 8064 |
| 43 | 8256 |
| 44 | 8448 |
| 45 | 8640 |
| 46 | 8832 |
| 47 | 9024 |
| 48 | 9216 |
| 49 | 9408 |
| 50 | 9600 |
| 51 | 9792 |
| 52 | 9984 |
| 53 | 10176 |
| 54 | 10368 |
| 55 | 10560 |
| 56 | 10752 |
| 57 | 10944 |
| 58 | 11136 |
| 59 | 11328 |
| 60 | 11520 |
| 61 | 11712 |
| 62 | 11904 |
| 63 | 12096 |
| 64 | 12288 |
| 65 | 12480 |
| 66 | 12672 |
| 67 | 12864 |
| 68 | 13056 |
| 69 | 13248 |
| 70 | 13440 |
| 71 | 13632 |
| 72 | 13824 |
| 73 | 14016 |
| 74 | 14208 |
| 75 | 14400 |
| 76 | 14592 |
| 77 | 14784 |
| 78 | 14976 |
| 79 | 15168 |
| 80 | 15360 |
| 81 | 15552 |
| 82 | 15744 |
| 83 | 15936 |
| 84 | 16128 |

TABLE 8-continued

| A number of allocated resource blocks | A number of transmission bits |
| --- | --- |
| 85 | 16320 |
| 86 | 16512 |
| 87 | 16704 |
| 88 | 16896 |
| 89 | 17088 |
| 90 | 17280 |
| 91 | 17472 |
| 92 | 17664 |
| 93 | 17856 |
| 94 | 18048 |
| 95 | 18240 |
| 96 | 18432 |
| 97 | 18624 |
| 98 | 18816 |
| 99 | 19008 |
| 100 | 19200 |

Table 9 presents resource block allocation for a case in which the modulation scheme is 16QAM, the encoding rate is ⅓, and the number of resource elements used for data transmission per resource block is 120.

TABLE 9

| A number of allocated resource blocks | A number of transmission bits |
| --- | --- |
| 1 | 160 |
| 2 | 320 |
| 3 | 480 |
| 4 | 640 |
| 5 | 800 |
| 6 | 960 |
| 7 | 1120 |
| 8 | 1280 |
| 9 | 1440 |
| 10 | 1600 |
| 11 | 1760 |
| 12 | 1920 |
| 14 | 2240 |
| 16 | 2560 |
| 18 | 2880 |
| 20 | 3200 |
| 22 | 3520 |
| 24 | 3840 |
| 26 | 4160 |
| 28 | 4480 |
| 30 | 4800 |
| 32 | 5120 |
| 34 | 5440 |
| 36 | 5760 |
| 38 | 6080 |
| 40 | 6400 |
| 42 | 6720 |
| 44 | 7040 |
| 46 | 7360 |
| 48 | 7680 |
| 50 | 8000 |
| 52 | 8320 |
| 54 | 8640 |
| 56 | 8960 |
| 58 | 9280 |
| 60 | 9600 |
| 62 | 9920 |
| 64 | 10240 |
| 66 | 10560 |
| 68 | 10880 |
| 70 | 11200 |
| 72 | 11520 |
| 74 | 11840 |
| 76 | 12160 |
| 78 | 12480 |
| 80 | 12800 |
| 82 | 13120 |
| 84 | 13440 |
| 86 | 13760 |

TABLE 9-continued

| A number of allocated resource blocks | A number of transmission bits |
| --- | --- |
| 88 | 14080 |
| 90 | 14400 |
| 92 | 14720 |
| 94 | 15040 |
| 96 | 15360 |
| 98 | 15680 |
| 100 | 16000 |

Table 10 presents resource block allocation for a case in which the modulation scheme is 16QAM, the encoding rate is ½, and the number of resource elements used for data transmission per resource block is 120.

TABLE 10

| A number of allocated resource blocks | A number of transmission bits |
| --- | --- |
| 1 | 240 |
| 2 | 480 |
| 3 | 720 |
| 4 | 960 |
| 6 | 1440 |
| 8 | 1920 |
| 12 | 2880 |
| 16 | 3840 |
| 20 | 4800 |
| 24 | 5760 |
| 28 | 6720 |
| 32 | 7680 |
| 36 | 8640 |
| 40 | 9600 |
| 44 | 10560 |
| 48 | 11520 |
| 52 | 12480 |
| 56 | 13440 |
| 60 | 14400 |
| 64 | 15360 |
| 68 | 16320 |
| 72 | 17280 |
| 76 | 18240 |
| 80 | 19200 |
| 84 | 20160 |
| 88 | 21120 |
| 92 | 22080 |
| 96 | 23040 |
| 100 | 24000 |

Table 11 presents resource block allocation for a case in which the modulation scheme is 16QAM, the encoding rate is ⅔, and the number of resource elements used for data transmission per resource block is 120.

TABLE 11

| A number of allocated resource blocks | A number of transmission bits |
| --- | --- |
| 1 | 320 |
| 2 | 640 |
| 3 | 960 |
| 4 | 1280 |
| 5 | 1600 |
| 6 | 1920 |
| 7 | 2240 |
| 8 | 2560 |
| 9 | 2880 |
| 10 | 3200 |
| 11 | 3520 |
| 12 | 3840 |
| 13 | 4160 |
| 14 | 4480 |
| 15 | 4800 |

TABLE 11-continued

| A number of allocated resource blocks | A number of transmission bits |
|---|---|
| 16 | 5120 |
| 17 | 5440 |
| 18 | 5760 |
| 19 | 6080 |
| 20 | 6400 |
| 21 | 6720 |
| 22 | 7040 |
| 23 | 7360 |
| 24 | 7680 |
| 25 | 8000 |
| 26 | 8320 |
| 27 | 8640 |
| 28 | 8960 |
| 29 | 9280 |
| 30 | 9600 |
| 31 | 9920 |
| 32 | 10240 |
| 33 | 10560 |
| 34 | 10880 |
| 35 | 11200 |
| 36 | 11520 |
| 37 | 11840 |
| 38 | 12160 |
| 39 | 12480 |
| 40 | 12800 |
| 41 | 13120 |
| 42 | 13440 |
| 43 | 13760 |
| 44 | 14080 |
| 45 | 14400 |
| 46 | 14720 |
| 47 | 15040 |
| 48 | 15360 |
| 49 | 15680 |
| 50 | 16000 |
| 51 | 16320 |
| 52 | 16640 |
| 53 | 16960 |
| 54 | 17280 |
| 55 | 17600 |
| 56 | 17920 |
| 57 | 18240 |
| 58 | 18560 |
| 59 | 18880 |
| 60 | 19200 |
| 61 | 19520 |
| 62 | 19840 |
| 63 | 20160 |
| 64 | 20480 |
| 65 | 20800 |
| 66 | 21120 |
| 67 | 21440 |
| 68 | 21760 |
| 69 | 22080 |
| 70 | 22400 |
| 71 | 22720 |
| 72 | 23040 |
| 73 | 23360 |
| 74 | 23680 |
| 75 | 24000 |
| 76 | 24320 |
| 77 | 24640 |
| 78 | 24960 |
| 79 | 25280 |
| 80 | 25600 |
| 81 | 25920 |
| 82 | 26240 |
| 83 | 26560 |
| 84 | 26880 |
| 85 | 27200 |
| 86 | 27520 |
| 87 | 27840 |
| 88 | 28160 |
| 89 | 28480 |
| 90 | 28800 |
| 91 | 29120 |
| 92 | 29440 |
| 93 | 29760 |
| 94 | 30080 |
| 95 | 30400 |
| 96 | 30720 |
| 97 | 31040 |
| 98 | 31360 |
| 99 | 31680 |
| 100 | 32000 |

Table 12 presents resource block allocation for a case in which the modulation scheme is 16QAM, the encoding rate is ¾, and the number of resource elements used for data transmission per resource block is 120.

TABLE 12

| A number of allocated resource blocks | A number of transmission bits |
|---|---|
| 1 | 360 |
| 2 | 720 |
| 4 | 1440 |
| 8 | 2880 |
| 16 | 5760 |
| 24 | 8640 |
| 32 | 11520 |
| 40 | 14400 |
| 48 | 17280 |
| 56 | 20160 |
| 64 | 23040 |
| 72 | 25920 |
| 80 | 28800 |
| 88 | 31680 |
| 96 | 34560 |

Table 13 presents resource block allocation for a case in which the modulation scheme is 16QAM, the encoding rate is ⅘, and the number of resource elements used for data transmission per resource block is 120.

TABLE 13

| A number of allocated resource blocks | A number of transmission bits |
|---|---|
| 1 | 384 |
| 2 | 768 |
| 3 | 1152 |
| 4 | 1536 |
| 5 | 1920 |
| 6 | 2304 |
| 7 | 2688 |
| 8 | 3072 |
| 9 | 3456 |
| 10 | 3840 |
| 11 | 4224 |
| 12 | 4608 |
| 13 | 4992 |
| 14 | 5376 |
| 15 | 5760 |
| 16 | 6144 |
| 17 | 6528 |
| 18 | 6912 |
| 19 | 7296 |
| 20 | 7680 |
| 21 | 8064 |
| 22 | 8448 |
| 23 | 8832 |
| 24 | 9216 |
| 25 | 9600 |
| 26 | 9984 |
| 27 | 10368 |

TABLE 13-continued

| A number of allocated resource blocks | A number of transmission bits |
|---|---|
| 28 | 10752 |
| 29 | 11136 |
| 30 | 11520 |
| 31 | 11904 |
| 32 | 12288 |
| 33 | 12672 |
| 34 | 13056 |
| 35 | 13440 |
| 36 | 13824 |
| 37 | 14208 |
| 38 | 14592 |
| 39 | 14976 |
| 40 | 15360 |
| 41 | 15744 |
| 42 | 16128 |
| 43 | 16512 |
| 44 | 16896 |
| 45 | 17280 |
| 46 | 17664 |
| 47 | 18048 |
| 48 | 18432 |
| 49 | 18816 |
| 50 | 19200 |
| 51 | 19584 |
| 52 | 19968 |
| 53 | 20352 |
| 54 | 20736 |
| 55 | 21120 |
| 56 | 21504 |
| 57 | 21888 |
| 58 | 22272 |
| 59 | 22656 |
| 60 | 23040 |
| 61 | 23424 |
| 62 | 23808 |
| 63 | 24192 |
| 64 | 24576 |
| 65 | 24960 |
| 66 | 25344 |
| 67 | 25728 |
| 68 | 26112 |
| 69 | 26496 |
| 70 | 26880 |
| 71 | 27264 |
| 72 | 27648 |
| 73 | 28032 |
| 74 | 28416 |
| 75 | 28800 |
| 76 | 29184 |
| 77 | 29568 |
| 78 | 29952 |
| 79 | 30336 |
| 80 | 30720 |
| 81 | 31104 |
| 82 | 31488 |
| 83 | 31872 |
| 84 | 32256 |
| 85 | 32640 |
| 86 | 33024 |
| 87 | 33408 |
| 88 | 33792 |
| 89 | 34176 |
| 90 | 34560 |
| 91 | 34944 |
| 92 | 35328 |
| 93 | 35712 |
| 94 | 36096 |
| 95 | 36480 |
| 96 | 36864 |
| 97 | 37248 |
| 98 | 37632 |
| 99 | 38016 |
| 100 | 38400 |

Table 14 presents resource block allocation for a case in which the modulation scheme is 64QAM, the encoding rate is ⅓, and the number of resource elements used for data transmission per resource block is 120.

TABLE 14

| A number of allocated resource blocks | A number of transmission bits |
|---|---|
| 1 | 240 |
| 2 | 480 |
| 3 | 720 |
| 4 | 960 |
| 6 | 1440 |
| 8 | 1920 |
| 12 | 2880 |
| 16 | 3840 |
| 20 | 4800 |
| 24 | 5760 |
| 28 | 6720 |
| 32 | 7680 |
| 36 | 8640 |
| 40 | 9600 |
| 44 | 10560 |
| 48 | 11520 |
| 52 | 12480 |
| 56 | 13440 |
| 60 | 14400 |
| 64 | 15360 |
| 68 | 16320 |
| 72 | 17280 |
| 76 | 18240 |
| 80 | 19200 |
| 84 | 20160 |
| 88 | 21120 |
| 92 | 22080 |
| 96 | 23040 |
| 100 | 24000 |

Table 15 presents resource block allocation for a case in which the modulation scheme is 64QAM, the encoding rate is ½, and the number of resource elements used for data transmission per resource block is 120.

TABLE 15

| A number of allocated resource blocks | A number of transmission bits |
|---|---|
| 1 | 360 |
| 2 | 720 |
| 4 | 1440 |
| 8 | 2880 |
| 16 | 5760 |
| 24 | 8640 |
| 32 | 11520 |
| 40 | 14400 |
| 48 | 17280 |
| 56 | 20160 |
| 64 | 23040 |
| 72 | 25920 |
| 80 | 28800 |
| 88 | 31680 |
| 96 | 34560 |

Table 16 presents resource block allocation for a case in which the modulation scheme is 64QAM, the encoding rate is ⅔, and the number of resource elements used for data transmission per resource block is 120.

TABLE 16

| A number of allocated resource blocks | A number of transmission bits |
|---|---|
| 1 | 480 |
| 2 | 960 |
| 3 | 1440 |

TABLE 16-continued

| A number of allocated resource blocks | A number of transmission bits |
|---|---|
| 4 | 1920 |
| 6 | 2880 |
| 8 | 3840 |
| 10 | 4800 |
| 12 | 5760 |
| 14 | 6720 |
| 16 | 7680 |
| 18 | 8640 |
| 20 | 9600 |
| 22 | 10560 |
| 24 | 11520 |
| 26 | 12480 |
| 28 | 13440 |
| 30 | 14400 |
| 32 | 15360 |
| 34 | 16320 |
| 36 | 17280 |
| 38 | 18240 |
| 40 | 19200 |
| 42 | 20160 |
| 44 | 21120 |
| 46 | 22080 |
| 48 | 23040 |
| 50 | 24000 |
| 52 | 24960 |
| 54 | 25920 |
| 56 | 26880 |
| 58 | 27840 |
| 60 | 28800 |
| 62 | 29760 |
| 64 | 30720 |
| 66 | 31680 |
| 68 | 32640 |
| 70 | 33600 |
| 72 | 34560 |
| 74 | 35520 |
| 76 | 36480 |
| 78 | 37440 |
| 80 | 38400 |
| 82 | 39360 |
| 84 | 40320 |
| 86 | 41280 |
| 88 | 42240 |
| 90 | 43200 |
| 92 | 44160 |
| 94 | 45120 |
| 96 | 46080 |
| 98 | 47040 |
| 100 | 48000 |

Table 17 presents resource block allocation for a case in which the modulation scheme is 64QAM, the encoding rate is ¾, and the number of resource elements used for data transmission per resource block is 120.

TABLE 17

| A number of allocated resource blocks | A number of transmission bits |
|---|---|
| 16 | 8640 |
| 32 | 17280 |
| 48 | 25920 |
| 64 | 34560 |
| 80 | 43200 |
| 96 | 51840 |

Table 18 presents resource block allocation for a case in which the modulation scheme is 64QAM, the encoding rate is ⅘, and the number of resource elements used for data transmission per resource block is 120.

TABLE 18

| A number of allocated resource blocks | A number of transmission bits |
|---|---|
| 1 | 576 |
| 2 | 1152 |
| 3 | 1728 |
| 4 | 2304 |
| 5 | 2880 |
| 6 | 3456 |
| 7 | 4032 |
| 8 | 4608 |
| 9 | 5184 |
| 10 | 5760 |
| 11 | 6336 |
| 12 | 6912 |
| 13 | 7488 |
| 14 | 8064 |
| 15 | 8640 |
| 16 | 9216 |
| 17 | 9792 |
| 18 | 10368 |
| 19 | 10944 |
| 20 | 11520 |
| 21 | 12096 |
| 22 | 12672 |
| 23 | 13248 |
| 24 | 13824 |
| 25 | 14400 |
| 26 | 14976 |
| 27 | 15552 |
| 28 | 16128 |
| 29 | 16704 |
| 30 | 17280 |
| 31 | 17856 |
| 32 | 18432 |
| 33 | 19008 |
| 34 | 19584 |
| 35 | 20160 |
| 36 | 20736 |
| 37 | 21312 |
| 38 | 21888 |
| 39 | 22464 |
| 40 | 23040 |
| 41 | 23616 |
| 42 | 24192 |
| 43 | 24768 |
| 44 | 25344 |
| 45 | 25920 |
| 46 | 26496 |
| 47 | 27072 |
| 48 | 27648 |
| 49 | 28224 |
| 50 | 28800 |
| 51 | 29376 |
| 52 | 29952 |
| 53 | 30528 |
| 54 | 31104 |
| 55 | 31680 |
| 56 | 32256 |
| 57 | 32832 |
| 58 | 33408 |
| 59 | 33984 |
| 60 | 34560 |
| 61 | 35136 |
| 62 | 35712 |
| 63 | 36288 |
| 64 | 36864 |
| 65 | 37440 |
| 66 | 38016 |
| 67 | 38592 |
| 68 | 39168 |
| 69 | 39744 |
| 70 | 40320 |
| 71 | 40896 |
| 72 | 41472 |
| 73 | 42048 |
| 74 | 42624 |
| 75 | 43200 |
| 76 | 43776 |
| 77 | 44352 |

TABLE 18-continued

| A number of allocated resource blocks | A number of transmission bits |
|---|---|
| 78 | 44928 |
| 79 | 45504 |
| 80 | 46080 |
| 81 | 46656 |
| 82 | 47232 |
| 83 | 47808 |
| 84 | 48384 |
| 85 | 48960 |
| 86 | 49536 |
| 87 | 50112 |
| 88 | 50688 |
| 89 | 51264 |
| 90 | 51840 |
| 91 | 52416 |
| 92 | 52992 |
| 93 | 53568 |
| 94 | 54144 |
| 95 | 54720 |
| 96 | 55296 |
| 97 | 55872 |
| 98 | 56448 |
| 99 | 57024 |
| 100 | 57600 |

Tables 19 to 35 present resource block allocation for each pair of a modulation scheme and an encoding scheme for cases in which the number of resource elements of downlink used for data transmission per resource block is 72 and the number of resource blocks is 6.

First, Table 19 presents resource block allocation for a case in which the modulation scheme is QPSK, the encoding rate is 1/9, and the number of resource elements used for data transmission per resource block is 72.

TABLE 19

| A number of allocated resource blocks | A number of transmission bits |
|---|---|
| 1 | 16 |
| 2 | 32 |
| 3 | 48 |
| 4 | 64 |
| 5 | 80 |
| 6 | 96 |

Table 20 presents resource block allocation for a case in which the modulation scheme is QPSK, the encoding rate is 1/6, and the number of resource elements used for data transmission per resource block is 72.

TABLE 20

| A number of allocated resource blocks | A number of transmission bits |
|---|---|
| 1 | 24 |
| 2 | 48 |
| 3 | 72 |
| 4 | 96 |
| 5 | 120 |
| 6 | 144 |

Table 21 presents resource block allocation for a case in which the modulation scheme is QPSK, the encoding rate is 1/3, and the number of resource elements used for data transmission per resource block is 72.

TABLE 21

| A number of allocated resource blocks | A number of transmission bits |
|---|---|
| 1 | 48 |
| 2 | 96 |
| 3 | 144 |
| 4 | 192 |
| 5 | 240 |
| 6 | 288 |

Table 22 presents resource block allocation for a case in which the modulation scheme is QPSK, the encoding rate is 1/2, and the number of resource elements used for data transmission per resource block is 72.

TABLE 22

| A number of allocated resource blocks | A number of transmission bits |
|---|---|
| 1 | 72 |
| 2 | 144 |
| 3 | 216 |
| 4 | 288 |
| 5 | 360 |
| 6 | 432 |

Table 23 presents resource block allocation for a case in which the modulation scheme is QPSK, the encoding rate is 2/3, and the number of resource elements used for data transmission per resource block is 72.

TABLE 23

| A number of allocated resource blocks | A number of transmission bits |
|---|---|
| 1 | 96 |
| 2 | 192 |
| 3 | 288 |
| 4 | 384 |
| 5 | 480 |
| 6 | 576 |

Table 24 presents resource block allocation for a case in which the modulation scheme is QPSK, the encoding rate is 3/4, and the number of resource elements used for data transmission per resource block is 72.

TABLE 24

| A number of allocated resource blocks | A number of transmission bits |
|---|---|
| 2 | 216 |
| 4 | 432 |

Table 25 presents resource block allocation for a case in which the modulation scheme is QPSK, the encoding rate is 4/5, and the number of resource elements used for data transmission per resource block is 72.

TABLE 25

| A number of allocated resource blocks | A number of transmission bits |
|---|---|
| 5 | 576 |

Table 26 presents resource block allocation for a case in which the modulation scheme is 16QAM, the encoding rate is ⅓, and the number of resource elements used for data transmission per resource block is 72.

TABLE 26

| A number of allocated resource blocks | A number of transmission bits |
|---|---|
| 1 | 96 |
| 2 | 192 |
| 3 | 288 |
| 4 | 384 |
| 5 | 480 |
| 6 | 576 |

Table 27 presents resource block allocation for a case in which the modulation scheme is 16QAM, the encoding rate is ½, and the number of resource elements used for data transmission per resource block is 72.

TABLE 27

| A number of allocated resource blocks | A number of transmission bits |
|---|---|
| 1 | 144 |
| 2 | 288 |
| 3 | 432 |
| 4 | 576 |
| 5 | 720 |
| 6 | 864 |

Table 28 presents resource block allocation for a case in which the modulation scheme is 16QAM, the encoding rate is ⅔, and the number of resource elements used for data transmission per resource block is 72.

TABLE 28

| A number of allocated resource blocks | A number of transmission bits |
|---|---|
| 1 | 192 |
| 2 | 384 |
| 3 | 576 |
| 4 | 768 |
| 5 | 960 |
| 6 | 1152 |

Table 29 presents resource block allocation for a case in which the modulation scheme is 16QAM, the encoding rate is ¾, and the number of resource elements used for data transmission per resource block is 72.

TABLE 29

| A number of allocated resource blocks | A number of transmission bits |
|---|---|
| 1 | 216 |
| 2 | 432 |
| 4 | 864 |

Table 30 presents resource block allocation for a case in which the modulation scheme is 16QAM, the encoding rate is ⅘, and the number of resource elements used for data transmission per resource block is 72.

TABLE 30

| A number of allocated resource blocks | A number of transmission bits |
|---|---|
| 5 | 1152 |

Table 31 presents resource block allocation for a case in which the modulation scheme is 64QAM, the encoding rate is ⅓, and the number of resource elements used for data transmission per resource block is 72.

TABLE 31

| A number of allocated resource blocks | A number of transmission bits |
|---|---|
| 1 | 144 |
| 2 | 288 |
| 3 | 432 |
| 4 | 576 |
| 5 | 720 |
| 6 | 864 |

Table 32 presents resource block allocation for a case in which the modulation scheme is 64QAM, the encoding rate is ½, and the number of resource elements used for data transmission per resource block is 72.

TABLE 32

| A number of allocated resource blocks | A number of transmission bits |
|---|---|
| 1 | 216 |
| 2 | 432 |
| 4 | 864 |

Table 33 presents resource block allocation for a case in which the modulation scheme is 64QAM, the encoding rate is ⅔, and the number of resource elements used for data transmission per resource block is 72.

TABLE 33

| A number of allocated resource blocks | A number of transmission bits |
|---|---|
| 1 | 288 |
| 2 | 576 |
| 3 | 864 |
| 4 | 1152 |
| 5 | 1440 |
| 6 | 1728 |

Table 34 presents resource block allocation for a case in which the modulation scheme is 64QAM, the encoding rate is ¾, and the number of resource elements used for data transmission per resource block is 72.

TABLE 34

| A number of allocated resource blocks | A number of transmission bits |
|---|---|
| Nothing | Nothing |

Table 35 presents resource block allocation for a case in which the modulation scheme is 64QAM, the encoding rate is ⅘, and the number of resource elements used for data transmission per resource block is 72.

TABLE 35

| A number of allocated resource blocks | A number of transmission bits |
|---|---|
| 5 | 1728 |

Tables of resource block allocation for uplink for cases in which the number of resource elements used for data transmission per resource block is 144 and 132 will be presented.

In uplink, the number of allocated resource blocks must be a multiple of 2, 3, or 5.

Tables 36 to 52 present resource block allocation for each pair of a modulation scheme and an encoding scheme in cases in which the number of resource elements of uplink used for data transmission per resource block is 144 and the number of resource blocks is 100.

First, Table 36 presents resource block allocation for a case in which the modulation scheme is QPSK, the encoding rate is ⅑, and the number of resource elements used for data transmission per resource block is 144.

TABLE 36

| A number of allocated resource blocks | A number of transmission bits |
|---|---|
| 1 | 32 |
| 2 | 64 |
| 3 | 96 |
| 4 | 128 |
| 5 | 160 |
| 6 | 192 |
| 8 | 256 |
| 9 | 288 |
| 10 | 320 |
| 12 | 384 |
| 15 | 480 |
| 16 | 512 |
| 18 | 576 |
| 20 | 640 |
| 24 | 768 |
| 25 | 800 |
| 27 | 864 |
| 30 | 960 |
| 32 | 1024 |
| 36 | 1152 |
| 40 | 1280 |
| 45 | 1440 |
| 48 | 1536 |
| 50 | 1600 |
| 54 | 1728 |
| 60 | 1920 |
| 64 | 2048 |
| 72 | 2304 |
| 80 | 2560 |
| 90 | 2880 |
| 96 | 3072 |
| 100 | 3200 |

Table 37 presents resource block allocation for a case in which the modulation scheme is QPSK, encoding rate is ⅙ and a number of resource elements of used for data transmission per a resource block is 144.

TABLE 37

| A number of allocated resource blocks | A number of transmission bits |
|---|---|
| 1 | 48 |
| 2 | 96 |
| 3 | 144 |
| 4 | 192 |
| 5 | 240 |
| 6 | 288 |
| 8 | 384 |
| 9 | 432 |
| 10 | 480 |
| 12 | 576 |
| 15 | 720 |
| 16 | 768 |
| 18 | 864 |
| 20 | 960 |
| 24 | 1152 |
| 30 | 1440 |
| 32 | 1536 |
| 36 | 1728 |
| 40 | 1920 |
| 48 | 2304 |
| 60 | 2880 |
| 64 | 3072 |
| 72 | 3456 |
| 80 | 3840 |

TABLE 37-continued

| A number of allocated resource blocks | A number of transmission bits |
|---|---|
| 96 | 4608 |
| 100 | 4800 |

Table 38 presents resource block allocation for a case in which the modulation scheme is QPSK, the encoding rate is ⅓, and the number of resource elements used for data transmission per resource block is 144.

TABLE 38

| A number of allocated resource blocks | A number of transmission bits |
|---|---|
| 1 | 96 |
| 2 | 192 |
| 3 | 288 |
| 4 | 384 |
| 5 | 480 |
| 6 | 576 |
| 8 | 768 |
| 9 | 864 |
| 10 | 960 |
| 12 | 1152 |
| 15 | 1440 |
| 16 | 1536 |
| 18 | 1728 |
| 20 | 1920 |
| 24 | 2304 |
| 30 | 2880 |
| 32 | 3072 |
| 36 | 3456 |
| 40 | 3840 |
| 48 | 4608 |
| 50 | 4800 |
| 54 | 5184 |
| 60 | 5760 |
| 64 | 6144 |
| 72 | 6912 |
| 80 | 7680 |
| 90 | 8640 |
| 96 | 9216 |
| 100 | 9600 |

Table 39 presents resource block allocation for a case in which the modulation scheme is QPSK, the encoding rate is ½, and the number of resource elements used for data transmission per resource block is 144.

TABLE 39

| A number of allocated resource blocks | A number of transmission bits |
|---|---|
| 1 | 144 |
| 2 | 288 |
| 3 | 432 |
| 4 | 576 |
| 5 | 720 |
| 6 | 864 |
| 8 | 1152 |
| 10 | 1440 |
| 12 | 1728 |
| 16 | 2304 |
| 20 | 2880 |
| 24 | 3456 |
| 32 | 4608 |
| 36 | 5184 |
| 40 | 5760 |
| 48 | 6912 |
| 60 | 8640 |
| 64 | 9216 |
| 72 | 10368 |
| 80 | 11520 |
| 96 | 13824 |
| 100 | 14400 |

Table 40 presents resource block allocation for a case in which the modulation scheme is QPSK, the encoding rate is ⅔, and the number of resource elements used for data transmission per resource block is 144.

TABLE 40

| A number of allocated resource blocks | A number of transmission bits |
|---|---|
| 1 | 192 |
| 2 | 384 |
| 3 | 576 |
| 4 | 768 |
| 5 | 960 |
| 6 | 1152 |
| 8 | 1536 |
| 9 | 1728 |
| 10 | 1920 |
| 12 | 2304 |
| 15 | 2880 |
| 16 | 3072 |
| 18 | 3456 |
| 20 | 3840 |
| 24 | 4608 |
| 25 | 4800 |
| 27 | 5184 |
| 30 | 5760 |
| 32 | 6144 |
| 36 | 6912 |
| 40 | 7680 |
| 45 | 8640 |
| 48 | 9216 |
| 50 | 9600 |
| 54 | 10368 |
| 60 | 11520 |
| 64 | 12288 |
| 72 | 13824 |
| 75 | 14400 |
| 80 | 15360 |
| 81 | 15552 |
| 90 | 17280 |
| 96 | 18432 |
| 100 | 19200 |

Table 41 presents resource block allocation for a case in which the modulation scheme is QPSK, the encoding rate is ¾, and the number of resource elements used for data transmission per resource block is 144.

TABLE 41

| A number of allocated resource blocks | A number of transmission bits |
|---|---|
| 1 | 216 |
| 2 | 432 |
| 4 | 864 |
| 8 | 1728 |
| 16 | 3456 |
| 24 | 5184 |
| 32 | 6912 |
| 40 | 8640 |
| 48 | 10368 |
| 56 | 12096 |
| 64 | 13824 |
| 72 | 15552 |
| 80 | 17280 |
| 88 | 19008 |
| 96 | 20736 |

Table 42 presents resource block allocation for a case in which the modulation scheme is QPSK, the encoding rate is ⅘, and the number of resource elements used for data transmission per resource block is 144.

TABLE 42

| A number of allocated resource blocks | A number of transmission bits |
|---|---|
| 5 | 1152 |
| 10 | 2304 |
| 15 | 3456 |
| 20 | 4608 |
| 25 | 5760 |
| 30 | 6912 |
| 40 | 9216 |
| 45 | 10368 |
| 50 | 11520 |
| 60 | 13824 |
| 75 | 17280 |
| 80 | 18432 |
| 90 | 20736 |
| 100 | 23040 |

Table 43 presents resource block allocation for a case in which the modulation scheme is 16QAM, the encoding rate is ⅓, and the number of resource elements used for data transmission per resource block is 144.

TABLE 43

| A number of allocated resource blocks | A number of transmission bits |
|---|---|
| 1 | 192 |
| 2 | 384 |
| 3 | 576 |
| 4 | 768 |
| 5 | 960 |
| 6 | 1152 |
| 8 | 1536 |
| 9 | 1728 |
| 10 | 1920 |
| 12 | 2304 |
| 15 | 2880 |
| 16 | 3072 |
| 18 | 3456 |
| 20 | 3840 |
| 24 | 4608 |
| 25 | 4800 |
| 27 | 5184 |
| 30 | 5760 |
| 32 | 6144 |
| 36 | 6912 |
| 40 | 7680 |
| 45 | 8640 |
| 48 | 9216 |
| 50 | 9600 |
| 54 | 10368 |
| 60 | 11520 |
| 64 | 12288 |
| 72 | 13824 |
| 75 | 14400 |
| 80 | 15360 |
| 81 | 15552 |
| 90 | 17280 |
| 91 | 17472 |
| 96 | 18432 |
| 100 | 19200 |

Table 44 presents resource block allocation for a case in which the modulation scheme is 16QAM, the encoding rate is ½, and the number of resource elements used for data transmission per resource block is 144.

TABLE 44

| A number of allocated resource blocks | A number of transmission bits |
|---|---|
| 1 | 288 |
| 2 | 576 |
| 3 | 864 |
| 4 | 1152 |

TABLE 44-continued

| A number of allocated resource blocks | A number of transmission bits |
|---|---|
| 5 | 1440 |
| 6 | 1728 |
| 8 | 2304 |
| 10 | 2880 |
| 12 | 3456 |
| 16 | 4608 |
| 18 | 5184 |
| 20 | 5760 |
| 24 | 6912 |
| 30 | 8640 |
| 32 | 9216 |
| 36 | 10368 |
| 40 | 11520 |
| 48 | 13824 |
| 50 | 14400 |
| 54 | 15552 |
| 60 | 17280 |
| 64 | 18432 |
| 72 | 20736 |
| 80 | 23040 |
| 90 | 25920 |
| 96 | 27648 |
| 100 | 28800 |

Table 45 presents resource block allocation for a case in which the modulation scheme is 16QAM, the encoding rate is ⅔, and the number of resource elements used for data transmission per resource block is 144.

TABLE 45

| A number of allocated resource blocks | A number of transmission bits |
|---|---|
| 1 | 384 |
| 2 | 768 |
| 3 | 1152 |
| 4 | 1536 |
| 5 | 1920 |
| 6 | 2304 |
| 8 | 3072 |
| 9 | 3456 |
| 10 | 3840 |
| 12 | 4608 |
| 15 | 5760 |
| 16 | 6144 |
| 18 | 6912 |
| 20 | 7680 |
| 24 | 9216 |
| 25 | 9600 |
| 27 | 10368 |
| 30 | 11520 |
| 32 | 12288 |
| 36 | 13824 |
| 40 | 15360 |
| 45 | 17280 |
| 48 | 18432 |
| 50 | 19200 |
| 54 | 20736 |
| 60 | 23040 |
| 64 | 24576 |
| 72 | 27648 |
| 75 | 28800 |
| 80 | 30720 |
| 81 | 31104 |
| 90 | 34560 |
| 91 | 34944 |
| 96 | 36864 |
| 100 | 38400 |

Table 46 presents resource block allocation for a case in which the modulation scheme is 16QAM, the encoding rate is ¾, and the number of resource elements used for data transmission per resource block is 144.

TABLE 46

| A number of allocated resource blocks | A number of transmission bits |
|---|---|
| 1 | 432 |
| 2 | 864 |
| 4 | 1728 |
| 8 | 3456 |
| 12 | 5184 |
| 16 | 6912 |
| 20 | 8640 |
| 24 | 10368 |
| 32 | 13824 |
| 36 | 15552 |
| 40 | 17280 |
| 48 | 20736 |
| 60 | 25920 |
| 64 | 27648 |
| 72 | 31104 |
| 80 | 34560 |
| 96 | 41472 |
| 100 | 43200 |

Table 47 presents resource block allocation for a case in which the modulation scheme is 16QAM, the encoding rate is ⅘, and the number of resource elements used for data transmission per resource block is 144.

TABLE 47

| A number of allocated resource blocks | A number of transmission bits |
|---|---|
| 5 | 2304 |
| 10 | 4608 |
| 15 | 6912 |
| 20 | 9216 |
| 25 | 11520 |
| 30 | 13824 |
| 40 | 18432 |
| 45 | 20736 |
| 50 | 23040 |
| 60 | 27648 |
| 75 | 34560 |
| 80 | 36864 |
| 90 | 41472 |
| 100 | 46080 |

Table 48 presents resource block allocation for a case in which the modulation scheme is 64QAM, the encoding rate is ⅓, and the number of resource elements used for data transmission per resource block is 144.

TABLE 48

| A number of allocated resource blocks | A number of transmission bits |
|---|---|
| 1 | 288 |
| 2 | 576 |
| 3 | 864 |
| 4 | 1152 |
| 5 | 1440 |
| 6 | 1728 |
| 8 | 2304 |
| 10 | 2880 |
| 12 | 3456 |
| 16 | 4608 |
| 18 | 5184 |
| 20 | 5760 |
| 24 | 6912 |
| 30 | 8640 |
| 32 | 9216 |
| 36 | 10368 |
| 40 | 11520 |
| 48 | 13824 |
| 50 | 14400 |
| 54 | 15552 |
| 60 | 17280 |

TABLE 48-continued

| A number of allocated resource blocks | A number of transmission bits |
|---|---|
| 64 | 18432 |
| 72 | 20736 |
| 80 | 23040 |
| 90 | 25920 |
| 96 | 27648 |
| 100 | 28800 |

Table 49 presents resource block allocation for a case in which the modulation scheme is 64QAM, the encoding rate is ½, and the number of resource elements used for data transmission per resource block is 144.

TABLE 49

| A number of allocated resource blocks | A number of transmission bits |
|---|---|
| 1 | 432 |
| 2 | 864 |
| 4 | 1728 |
| 8 | 3456 |
| 12 | 5184 |
| 16 | 6912 |
| 20 | 8640 |
| 24 | 10368 |
| 32 | 13824 |
| 36 | 15552 |
| 40 | 17280 |
| 48 | 20736 |
| 60 | 25920 |
| 64 | 27648 |
| 72 | 31104 |
| 80 | 34560 |
| 96 | 41472 |
| 100 | 43200 |

Table 50 presents resource block allocation for a case in which the modulation scheme is 64QAM, the encoding rate is ⅔, and the number of resource elements used for data transmission per resource block is 144.

TABLE 50

| A number of allocated resource blocks | A number of transmission bits |
|---|---|
| 1 | 576 |
| 2 | 1152 |
| 3 | 1728 |
| 4 | 2304 |
| 5 | 2880 |
| 6 | 3456 |
| 8 | 4608 |
| 9 | 5184 |
| 10 | 5760 |
| 12 | 6912 |
| 15 | 8640 |
| 16 | 9216 |
| 18 | 10368 |
| 20 | 11520 |
| 24 | 13824 |
| 25 | 14400 |
| 27 | 15552 |
| 30 | 17280 |
| 32 | 18432 |
| 36 | 20736 |
| 40 | 23040 |
| 45 | 25920 |
| 48 | 27648 |
| 50 | 28800 |
| 54 | 31104 |
| 60 | 34560 |
| 64 | 36864 |
| 72 | 41472 |
| 75 | 43200 |

TABLE 50-continued

| A number of allocated resource blocks | A number of transmission bits |
|---|---|
| 80 | 46080 |
| 81 | 46656 |
| 90 | 51840 |
| 91 | 52416 |
| 96 | 55296 |
| 100 | 57600 |

Table 51 presents resource block allocation for a case in which the modulation scheme is 64QAM, the encoding rate is ¾, and the number of resource elements used for data transmission per resource block is 144.

TABLE 51

| A number of allocated resource blocks | A number of transmission bits |
|---|---|
| 8 | 5184 |
| 16 | 10368 |
| 24 | 15552 |
| 32 | 20736 |
| 40 | 25920 |
| 48 | 31104 |
| 64 | 41472 |
| 72 | 46656 |
| 88 | 57024 |
| 96 | 62208 |

Table 52 presents resource block allocation for a case in which the modulation scheme is 64QAM, the encoding rate is ⅘, and the number of resource elements used for data transmission per resource block is 144.

TABLE 52

| A number of allocated resource blocks | A number of transmission bits |
|---|---|
| 5 | 3456 |
| 10 | 6912 |
| 15 | 10368 |
| 20 | 13824 |
| 25 | 17280 |
| 30 | 20736 |
| 40 | 27648 |
| 45 | 31104 |
| 50 | 34560 |
| 60 | 41472 |
| 75 | 51840 |
| 80 | 55296 |
| 90 | 62208 |
| 100 | 69120 |

Tables 53 to 69 present resource block allocation for each pair of a modulation scheme and an encoding rate in cases in which the number of resource elements of uplink used for data transmission per resource block is 132 and the number of resource blocks is 100.

Table 53 presents resource block allocation for a case in which the modulation scheme is QPSK, the encoding rate is ⅑, and the number of resource elements used for data transmission per resource block is 132.

TABLE 53

| A number of allocated resource blocks | A number of transmission bits |
|---|---|
| 3 | 88 |
| 6 | 176 |
| 9 | 264 |
| 12 | 352 |
| 15 | 440 |

TABLE 53-continued

| A number of allocated resource blocks | A number of transmission bits |
|---|---|
| 18 | 528 |
| 24 | 704 |
| 30 | 880 |
| 36 | 1056 |
| 48 | 1408 |
| 60 | 1760 |
| 72 | 2112 |
| 96 | 2816 |

Table 54 presents resource block allocation for a case in which the modulation scheme is QPSK, the encoding rate is ⅙, and the number of resource elements used for data transmission per resource block is 132.

TABLE 54

| A number of allocated resource blocks | A number of transmission bits |
|---|---|
| 2 | 88 |
| 4 | 176 |
| 6 | 264 |
| 8 | 352 |
| 10 | 440 |
| 12 | 528 |
| 16 | 704 |
| 20 | 880 |
| 24 | 1056 |
| 32 | 1408 |
| 40 | 1760 |
| 48 | 2112 |
| 64 | 2816 |
| 80 | 3520 |
| 96 | 4224 |

Table 55 presents resource block allocation for a case in which the modulation scheme is QPSK, the encoding rate is ⅓, and the number of resource elements used for data transmission per resource block is 132.

TABLE 55

| A number of allocated resource blocks | A number of transmission bits |
|---|---|
| 1 | 88 |
| 2 | 176 |
| 3 | 264 |
| 4 | 352 |
| 5 | 440 |
| 6 | 528 |
| 8 | 704 |
| 10 | 880 |
| 12 | 1056 |
| 16 | 1408 |
| 20 | 1760 |
| 24 | 2112 |
| 32 | 2816 |
| 40 | 3520 |
| 48 | 4224 |
| 64 | 5632 |
| 72 | 6336 |
| 80 | 7040 |
| 96 | 8448 |

Table 56 presents resource block allocation for a case in which the modulation scheme is QPSK, the encoding rate is ½, and the number of resource elements used for data transmission per resource block is 132.

TABLE 56

| A number of allocated resource blocks | A number of transmission bits |
|---|---|
| 2 | 264 |
| 4 | 528 |
| 8 | 1056 |
| 16 | 2112 |
| 32 | 4224 |
| 48 | 6336 |
| 64 | 8448 |
| 80 | 10560 |
| 96 | 12672 |

Table 57 presents resource block allocation for a case in which the modulation scheme is QPSK, the encoding rate is ⅔, and the number of resource elements used for data transmission per resource block is 132.

TABLE 57

| A number of allocated resource blocks | A number of transmission bits |
|---|---|
| 1 | 176 |
| 2 | 352 |
| 3 | 528 |
| 4 | 704 |
| 5 | 880 |
| 6 | 1056 |
| 8 | 1408 |
| 10 | 1760 |
| 12 | 2112 |
| 16 | 2816 |
| 20 | 3520 |
| 24 | 4224 |
| 32 | 5632 |
| 36 | 6336 |
| 40 | 7040 |
| 48 | 8448 |
| 60 | 10560 |
| 64 | 11264 |
| 72 | 12672 |
| 80 | 14080 |
| 96 | 16896 |
| 100 | 17600 |

Table 58 presents resource block allocation for a case in which the modulation scheme is QPSK, the encoding rate is ¾, and the number of resource elements used for data transmission per resource block is 132.

TABLE 58

| A number of allocated resource blocks | A number of transmission bits |
|---|---|
| 32 | 6336 |
| 64 | 12672 |
| 96 | 19008 |

Table 59 presents resource block allocation for a case in which the modulation scheme is QPSK, the encoding rate is ⅘, and the number of resource elements used for data transmission per resource block is 132.

TABLE 59

| A number of allocated resource blocks | A number of transmission bits |
|---|---|
| 5 | 1056 |
| 10 | 2112 |
| 20 | 4224 |
| 30 | 6336 |
| 40 | 8448 |
| 50 | 10560 |
| 60 | 12672 |

TABLE 59-continued

| A number of allocated resource blocks | A number of transmission bits |
|---|---|
| 80 | 16896 |
| 90 | 19008 |
| 100 | 21120 |

Table 60 presents resource block allocation for a case in which the modulation scheme is 16QAM, the encoding rate is ⅓, and the number of resource elements used for data transmission per resource block is 132.

TABLE 60

| A number of allocated resource blocks | A number of transmission bits |
|---|---|
| 1 | 176 |
| 2 | 352 |
| 3 | 528 |
| 4 | 704 |
| 5 | 880 |
| 6 | 1056 |
| 8 | 1408 |
| 10 | 1760 |
| 12 | 2112 |
| 16 | 2816 |
| 20 | 3520 |
| 24 | 4224 |
| 32 | 5632 |
| 36 | 6336 |
| 40 | 7040 |
| 44 | 7744 |
| 48 | 8448 |
| 60 | 10560 |
| 64 | 11264 |
| 72 | 12672 |
| 80 | 14080 |
| 96 | 16896 |
| 100 | 17600 |

Table 61 presents resource block allocation for a case in which the modulation scheme is 16QAM, the encoding rate is ½, and the number of resource elements used for data transmission per resource block is 132.

TABLE 61

| A number of allocated resource blocks | A number of transmission bits |
|---|---|
| 1 | 264 |
| 2 | 528 |
| 4 | 1056 |
| 8 | 2112 |
| 16 | 4224 |
| 24 | 6336 |
| 32 | 8448 |
| 40 | 10560 |
| 48 | 12672 |
| 64 | 16896 |
| 72 | 19008 |
| 80 | 21120 |
| 96 | 25344 |

Table 62 presents resource block allocation for a case in which the modulation scheme is 16QAM, the encoding rate is ⅔, and the number of resource elements used for data transmission per resource block is 132.

TABLE 62

| A number of allocated resource blocks | A number of transmission bits |
|---|---|
| 1 | 352 |
| 2 | 704 |

TABLE 62-continued

| A number of allocated resource blocks | A number of transmission bits |
|---|---|
| 3 | 1056 |
| 4 | 1408 |
| 5 | 1760 |
| 6 | 2112 |
| 8 | 2816 |
| 10 | 3520 |
| 12 | 4224 |
| 16 | 5632 |
| 18 | 6336 |
| 20 | 7040 |
| 24 | 8448 |
| 30 | 10560 |
| 32 | 11264 |
| 36 | 12672 |
| 40 | 14080 |
| 48 | 16896 |
| 50 | 17600 |
| 54 | 19008 |
| 60 | 21120 |
| 64 | 22528 |
| 72 | 25344 |
| 80 | 28160 |
| 90 | 31680 |
| 96 | 33792 |
| 100 | 35200 |

Table 63 presents resource block allocation for a case in which the modulation scheme is 16QAM, the encoding rate is ¾, and the number of resource elements of used for data transmission per resource block is 132.

TABLE 63

| A number of allocated resource blocks | A number of transmission bits |
|---|---|
| 16 | 6336 |
| 32 | 12672 |
| 48 | 19008 |
| 64 | 25344 |
| 80 | 31680 |
| 96 | 38016 |

Table 64 presents resource block allocation for a case in which the modulation scheme is 16QAM, the encoding rate is ⅘, and the number of resource elements used for data transmission per resource block is 132.

TABLE 64

| A number of allocated resource blocks | A number of transmission bits |
|---|---|
| 5 | 2112 |
| 10 | 4224 |
| 15 | 6336 |
| 20 | 8448 |
| 25 | 10560 |
| 30 | 12672 |
| 40 | 16896 |
| 45 | 19008 |
| 50 | 21120 |
| 60 | 25344 |
| 75 | 31680 |
| 80 | 33792 |
| 90 | 38016 |
| 100 | 42240 |

Table 65 presents resource block allocation for a case in which the modulation scheme is 64QAM, the encoding rate is ⅓, and the number of resource elements used for data transmission per resource block is 132.

TABLE 65

| A number of allocated resource blocks | A number of transmission bits |
|---|---|
| 1 | 264 |
| 2 | 528 |
| 4 | 1056 |
| 8 | 2112 |
| 16 | 4224 |
| 24 | 6336 |
| 32 | 8448 |
| 40 | 10560 |
| 48 | 12672 |
| 64 | 16896 |
| 72 | 19008 |
| 80 | 21120 |
| 96 | 25344 |

Table 66 presents resource block allocation for a case in which the modulation scheme is 64QAM, the encoding rate is ½, and the number of resource elements used for data transmission per resource block is 132.

TABLE 66

| A number of allocated resource blocks | A number of transmission bits |
|---|---|
| 16 | 6336 |
| 32 | 12672 |
| 48 | 19008 |
| 64 | 25344 |
| 80 | 31680 |
| 96 | 38016 |

Table 67 presents resource block allocation for a case in which the modulation scheme is 64QAM, the encoding rate is ⅔, and the number of resource elements used for data transmission per resource block is 132.

TABLE 67

| A number of allocated resource blocks | A number of transmission bits |
|---|---|
| 1 | 528 |
| 2 | 1056 |
| 4 | 2112 |
| 8 | 4224 |
| 12 | 6336 |
| 16 | 8448 |
| 20 | 10560 |
| 24 | 12672 |
| 32 | 16896 |
| 36 | 19008 |
| 40 | 21120 |
| 48 | 25344 |
| 60 | 31680 |
| 64 | 33792 |
| 72 | 38016 |
| 80 | 42240 |
| 96 | 50688 |
| 100 | 52800 |

Table 68 presents resource block allocation for a case in which the modulation scheme is 64QAM, the encoding rate is ¾, and the number of resource elements used for data transmission per resource block is 132.

TABLE 68

| A number of allocated resource blocks | A number of transmission bits |
|---|---|
| 32 | 19008 |
| 64 | 38016 |
| 96 | 57024 |

Table 69 presents resource block allocation for a case in which the modulation scheme is 64QAM, the encoding rate is ⅘, and the number of resource elements used for data transmission per resource block is 132.

TABLE 69

| A number of allocated resource blocks | A number of transmission bits |
|---|---|
| 10 | 6336 |
| 20 | 12672 |
| 30 | 19008 |
| 40 | 25344 |
| 50 | 31680 |
| 60 | 38016 |
| 80 | 50688 |
| 90 | 57024 |
| 100 | 63360 |

A table of transmission block size will now be described.

Because some bits can be deleted or inserted during the encoding scheme of the transmission block, the transmission block size can be different from the number of transmission bits.

But in an exemplary embodiment of the present invention, we assume that the transmission block size is the same as the number of transmission bits.

If the number of bits used for transmitting the transmission block size is 8 bits, 256 transmission block sizes can be established.

When duplicate numbers of transmission bits of Tables 2 to 35 are excluded, a table of transmission block size of downlink such as Table 70 is acquired.

TABLE 70

| Id | Size |
|---|---|
| 1 | 24 |
| 2 | 48 |
| 3 | 56 |
| 4 | 72 |
| 5 | 96 |
| 6 | 120 |
| 7 | 136 |
| 8 | 168 |
| 9 | 176 |
| 10 | 192 |
| 11 | 216 |
| 12 | 264 |
| 13 | 296 |
| 14 | 336 |
| 15 | 360 |
| 15 | 376 |
| 17 | 408 |
| 18 | 416 |
| 19 | 456 |
| 20 | 536 |
| 21 | 552 |
| 22 | 616 |
| 23 | 696 |
| 24 | 744 |
| 25 | 776 |
| 26 | 840 |
| 27 | 856 |
| 28 | 936 |
| 29 | 1096 |
| 30 | 1128 |
| 31 | 1256 |
| 32 | 1416 |
| 33 | 1512 |
| 34 | 1576 |
| 35 | 1704 |
| 36 | 1736 |
| 37 | 1896 |
| 38 | 2216 |

TABLE 70-continued

| Id | Size |
|---|---|
| 39 | 2280 |
| 40 | 2535 |
| 41 | 2664 |
| 42 | 2856 |
| 43 | 3048 |
| 44 | 3176 |
| 45 | 3432 |
| 46 | 3496 |
| 47 | 3816 |
| 48 | 4008 |
| 49 | 4136 |
| 50 | 4200 |
| 51 | 4392 |
| 52 | 4456 |
| 53 | 4584 |
| 54 | 4776 |
| 55 | 4968 |
| 56 | 5096 |
| 57 | 5160 |
| 58 | 5352 |
| 59 | 5416 |
| 60 | 5736 |
| 61 | 6056 |
| 62 | 6120 |
| 63 | 6312 |
| 64 | 6376 |
| 65 | 6504 |
| 66 | 6696 |
| 67 | 6888 |
| 68 | 7016 |
| 69 | 7272 |
| 70 | 7336 |
| 71 | 7464 |
| 72 | 7656 |
| 73 | 7976 |
| 74 | 8040 |
| 75 | 8296 |
| 76 | 8424 |
| 77 | 8616 |
| 78 | 8808 |
| 79 | 8936 |
| 80 | 9192 |
| 81 | 9256 |
| 82 | 9576 |
| 83 | 9768 |
| 84 | 9896 |
| 85 | 9960 |
| 86 | 10216 |
| 87 | 10344 |
| 88 | 10536 |
| 89 | 10728 |
| 90 | 10856 |
| 91 | 10920 |
| 92 | 11112 |
| 93 | 11176 |
| 94 | 11496 |
| 95 | 11816 |
| 96 | 11880 |
| 97 | 12072 |
| 98 | 12136 |
| 99 | 12264 |
| 100 | 12456 |
| 101 | 12648 |
| 102 | 12776 |
| 103 | 13032 |
| 104 | 13096 |
| 105 | 13224 |
| 106 | 13416 |
| 107 | 13736 |
| 108 | 13800 |
| 109 | 14056 |
| 110 | 14184 |
| 111 | 14376 |
| 112 | 14568 |
| 113 | 14696 |
| 114 | 14952 |
| 115 | 15016 |
| 116 | 15336 |
| 117 | 15528 |
| 118 | 15656 |
| 119 | 15720 |
| 120 | 15976 |
| 121 | 16104 |
| 122 | 16296 |
| 123 | 16488 |
| 124 | 16616 |
| 125 | 16680 |
| 126 | 16872 |
| 127 | 16936 |
| 128 | 17256 |
| 129 | 17576 |
| 130 | 17640 |
| 131 | 17832 |
| 132 | 17896 |
| 133 | 18024 |
| 134 | 18216 |
| 135 | 18408 |
| 136 | 18536 |
| 137 | 18600 |
| 138 | 18792 |
| 139 | 18856 |
| 140 | 18984 |
| 141 | 19176 |
| 142 | 19496 |
| 143 | 19560 |
| 144 | 19816 |
| 145 | 19944 |
| 146 | 20136 |
| 147 | 20328 |
| 148 | 20456 |
| 149 | 20712 |
| 150 | 20776 |
| 151 | 21096 |
| 152 | 21288 |
| 153 | 21416 |
| 154 | 21480 |
| 155 | 21736 |
| 156 | 21864 |
| 157 | 22056 |
| 158 | 22248 |
| 159 | 22376 |
| 160 | 22440 |
| 161 | 22632 |
| 162 | 22696 |
| 163 | 23016 |
| 164 | 23336 |
| 165 | 23400 |
| 166 | 23592 |
| 167 | 23656 |
| 168 | 23784 |
| 169 | 23976 |
| 170 | 24168 |
| 171 | 24296 |
| 172 | 24552 |
| 173 | 24616 |
| 174 | 24744 |
| 175 | 24936 |
| 176 | 25256 |
| 177 | 25320 |
| 178 | 25576 |
| 179 | 25704 |
| 180 | 25896 |
| 181 | 26088 |
| 182 | 26216 |
| 183 | 26472 |
| 184 | 26536 |
| 185 | 26856 |
| 186 | 27048 |
| 187 | 27176 |
| 188 | 27240 |
| 189 | 27496 |
| 190 | 27624 |
| 191 | 27816 |
| 192 | 28008 |
| 193 | 28136 |
| 194 | 28200 |

TABLE 70-continued

| Id | Size |
|---|---|
| 195 | 28392 |
| 196 | 28456 |
| 197 | 28776 |
| 198 | 29096 |
| 199 | 29160 |
| 200 | 29352 |
| 201 | 29416 |
| 202 | 29544 |
| 203 | 29736 |
| 204 | 29928 |
| 205 | 30056 |
| 206 | 30312 |
| 207 | 30376 |
| 208 | 30504 |
| 209 | 30696 |
| 210 | 31016 |
| 211 | 31080 |
| 212 | 31336 |
| 213 | 31464 |
| 214 | 31656 |
| 215 | 31848 |
| 216 | 31976 |
| 217 | 32232 |
| 218 | 32616 |
| 219 | 32808 |
| 220 | 33000 |
| 221 | 33384 |
| 222 | 33576 |
| 223 | 33768 |
| 224 | 33960 |
| 225 | 34152 |
| 226 | 34536 |
| 227 | 34920 |
| 228 | 35112 |
| 229 | 35304 |
| 230 | 35496 |
| 231 | 35688 |
| 232 | 36072 |
| 233 | 36264 |
| 234 | 36456 |
| 235 | 36840 |
| 236 | 37224 |
| 237 | 37416 |
| 238 | 37608 |
| 239 | 37992 |
| 240 | 38376 |
| 241 | 38568 |
| 242 | 39144 |
| 243 | 39336 |
| 244 | 39720 |
| 245 | 40296 |
| 246 | 40872 |
| 247 | 41256 |
| 248 | 41448 |
| 249 | 42024 |
| 250 | 42216 |
| 251 | 42600 |
| 252 | 43176 |
| 253 | 43752 |
| 254 | 44136 |
| 255 | 44328 |
| 256 | 44904 |

When duplicate numbers of transmission bits of Tables 36 to 69 are excluded, a table of transmission block size of uplink such as Table 71 is acquired.

TABLE 71

| Id | Size |
|---|---|
| 1 | 8 |
| 2 | 24 |
| 3 | 40 |
| 4 | 64 |
| 5 | 72 |

TABLE 71-continued

| Id | Size |
|---|---|
| 6 | 104 |
| 7 | 120 |
| 8 | 136 |
| 9 | 152 |
| 10 | 168 |
| 11 | 216 |
| 12 | 232 |
| 13 | 240 |
| 14 | 264 |
| 15 | 296 |
| 16 | 328 |
| 17 | 360 |
| 18 | 408 |
| 19 | 416 |
| 20 | 456 |
| 21 | 488 |
| 22 | 504 |
| 23 | 552 |
| 24 | 616 |
| 25 | 680 |
| 26 | 696 |
| 27 | 744 |
| 28 | 776 |
| 29 | 840 |
| 30 | 856 |
| 31 | 936 |
| 32 | 1000 |
| 33 | 1032 |
| 34 | 1128 |
| 35 | 1256 |
| 36 | 1384 |
| 37 | 1416 |
| 38 | 1512 |
| 39 | 1576 |
| 40 | 1704 |
| 41 | 1736 |
| 42 | 1896 |
| 43 | 2088 |
| 44 | 2280 |
| 45 | 2792 |
| 46 | 2856 |
| 47 | 3048 |
| 48 | 3432 |
| 49 | 3496 |
| 50 | 3816 |
| 51 | 4200 |
| 52 | 4584 |
| 53 | 4776 |
| 54 | 5160 |
| 55 | 5608 |
| 56 | 5736 |
| 57 | 6120 |
| 58 | 6312 |
| 59 | 6888 |
| 60 | 7016 |
| 61 | 7656 |
| 62 | 8424 |
| 63 | 8616 |
| 64 | 9192 |
| 65 | 9576 |
| 66 | 10344 |
| 67 | 10536 |
| 68 | 11240 |
| 69 | 11496 |
| 70 | 12264 |
| 71 | 12648 |
| 72 | 13800 |
| 73 | 14056 |
| 74 | 14376 |
| 75 | 15336 |
| 76 | 15528 |
| 77 | 16872 |
| 78 | 17256 |
| 79 | 17576 |
| 80 | 18408 |
| 81 | 18984 |
| 82 | 19176 |
| 83 | 20712 |

TABLE 71-continued

| Id | Size |
|---|---|
| 84 | 21096 |
| 85 | 23016 |
| 86 | 25320 |
| 87 | 25896 |
| 88 | 27624 |
| 89 | — |
| 90 | — |
| 91 | — |
| 92 | — |
| 93 | — |
| 94 | — |
| 95 | — |
| 96 | — |
| 97 | — |
| 98 | — |
| 99 | — |
| 100 | — |
| 101 | — |
| 102 | — |
| 103 | — |
| 104 | — |
| 105 | — |
| 106 | — |
| 107 | — |
| 108 | — |
| 109 | — |
| 110 | — |
| 111 | — |
| 112 | — |
| 113 | — |
| 114 | — |
| 115 | — |
| 116 | — |
| 117 | — |
| 118 | — |
| 119 | — |
| 120 | — |
| 121 | — |
| 122 | — |
| 123 | — |
| 124 | — |
| 125 | — |
| 126 | — |
| 127 | — |
| 128 | — |
| 129 | — |
| 130 | — |
| 131 | — |
| 132 | — |
| 133 | — |
| 134 | — |
| 135 | — |
| 136 | — |
| 137 | — |
| 138 | — |
| 139 | — |
| 140 | — |
| 141 | — |
| 142 | — |
| 143 | — |
| 144 | — |
| 145 | — |
| 146 | — |
| 147 | — |
| 148 | — |
| 149 | — |
| 150 | — |
| 151 | — |
| 152 | — |
| 153 | — |
| 154 | — |
| 155 | — |
| 156 | — |
| 157 | — |
| 158 | — |
| 159 | — |
| 160 | — |
| 161 | — |

TABLE 71-continued

| Id | Size |
|---|---|
| 162 | — |
| 163 | — |
| 164 | — |
| 165 | — |
| 166 | — |
| 167 | — |
| 168 | — |
| 169 | — |
| 170 | — |
| 171 | — |
| 172 | — |
| 173 | — |
| 174 | — |
| 175 | — |
| 176 | — |
| 177 | — |
| 178 | — |
| 179 | — |
| 180 | — |
| 181 | — |
| 182 | — |
| 183 | — |
| 184 | — |
| 185 | — |
| 186 | — |
| 187 | — |
| 188 | — |
| 189 | — |
| 190 | — |
| 191 | — |
| 192 | — |
| 193 | — |
| 194 | — |
| 195 | — |
| 196 | — |
| 197 | — |
| 198 | — |
| 199 | — |
| 200 | — |
| 201 | — |
| 202 | — |
| 203 | — |
| 204 | — |
| 205 | — |
| 206 | — |
| 207 | — |
| 208 | — |
| 209 | — |
| 210 | — |
| 211 | — |
| 212 | — |
| 213 | — |
| 214 | — |
| 215 | — |
| 216 | — |
| 217 | — |
| 218 | — |
| 219 | — |
| 220 | — |
| 221 | — |
| 222 | — |
| 223 | — |
| 224 | — |
| 225 | — |
| 226 | — |
| 227 | — |
| 228 | — |
| 229 | — |
| 230 | — |
| 231 | — |
| 232 | — |
| 233 | — |
| 234 | — |
| 235 | — |
| 236 | — |
| 237 | — |
| 238 | — |
| 239 | — |

TABLE 71-continued

| Id | Size |
|---|---|
| 240 | — |
| 241 | — |
| 242 | — |
| 243 | — |
| 244 | — |
| 245 | — |
| 246 | — |
| 247 | — |
| 248 | — |
| 249 | — |
| 250 | — |
| 251 | — |
| 252 | — |
| 253 | — |
| 254 | — |
| 255 | — |
| 256 | — |

Next, an apparatus for resource allocation according to an exemplary embodiment of the present invention will be described referring to FIG. 2.

Figure 2:
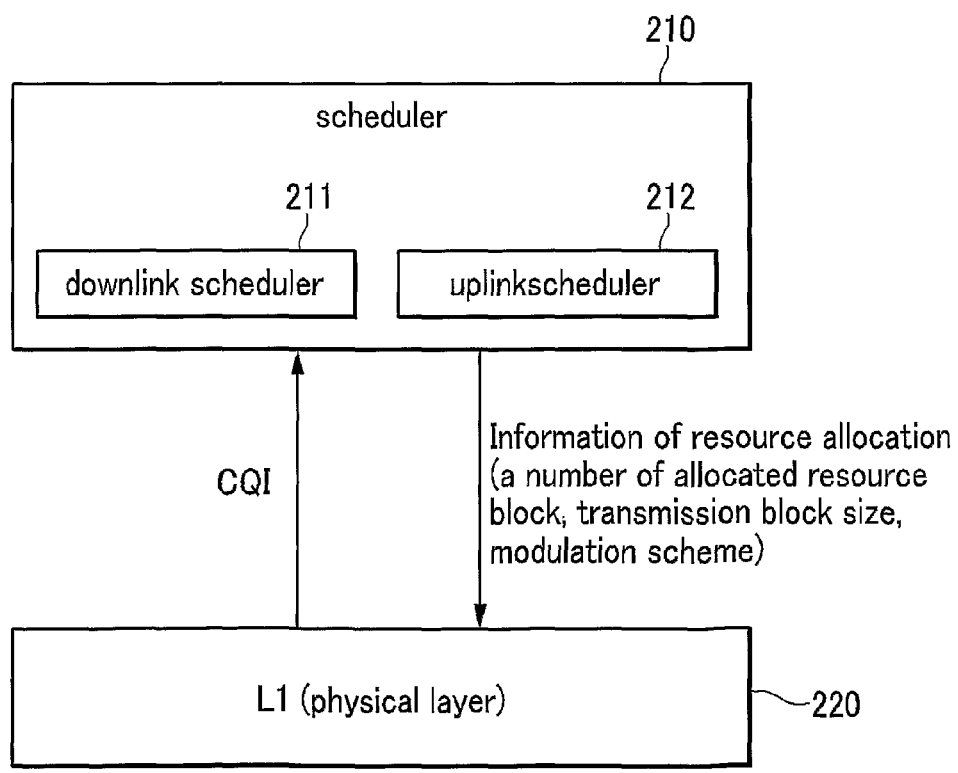
FIG. 2 is a schematic diagram of an apparatus for resource allocation according to an exemplary embodiment of the present invention.

FIG. 2 is a schematic diagram of an apparatus for resource allocation according to an exemplary embodiment of the present invention.

As shown in FIG. 2, an apparatus for resource allocation according to an exemplary embodiment of the present invention includes a scheduler 210 and a physical layer 220, and the scheduler 210 includes a downlink scheduler 211 and an uplink scheduler 212.

The downlink scheduler 211 receives channel quality information (CQI) of downlink from the physical layer 220, decides on a modulation scheme and an encoding scheme according to the CQI of the downlink, and decides on a number of allocated resource blocks and the transmission block size according to transmission data size referring to the table of resource block allocation.

The downlink scheduler 211 transmits information of resource allocation of downlink (the decided-on modulation scheme, encoding scheme, number of allocated resource blocks, and transmission block size) to the physical layer 220.

The uplink scheduler 212 receives channel quality information (CQI) of uplink from the physical layer 220, decides on the modulation scheme and the encoding scheme according to the CQI of the uplink, and decides on a number of allocated resource blocks and the transmission block size according to the size of data that a terminal will transmit to a base station referring to the table of resource block allocation.

The uplink scheduler 212 transmits information of resource allocation of uplink (the decided-on modulation scheme, encoding scheme, number of allocated resource blocks, and transmission block size) to the physical layer 220.

The physical layer 220 receives CQI of downlink from a terminal, and transmits the CQI of downlink to the downlink scheduler 211. The physical layer 220 receives the information of resource allocation of downlink from the downlink scheduler 211, and transmits the information of resource allocation of downlink to a terminal.

The physical layer 220 measures CQI of uplink and transmits the CQI of uplink to the uplink scheduler 211. The physical layer 220 receives the information of resource allocation of uplink from the uplink scheduler 211, and modulates and encodes transmission data according to the information of resource allocation of uplink and transmits the modulated and encoded data.

Next, a method for resource allocation according to an exemplary embodiment of the present invention will be described referring to FIG. 3.

The uplink scheduler 211 and the downlink scheduler 212 allocate resources to uplink and downlink. The method for resource allocation of the uplink scheduler 211 is the same as the method for resource allocation of the downlink scheduler 212.

Figure 3:
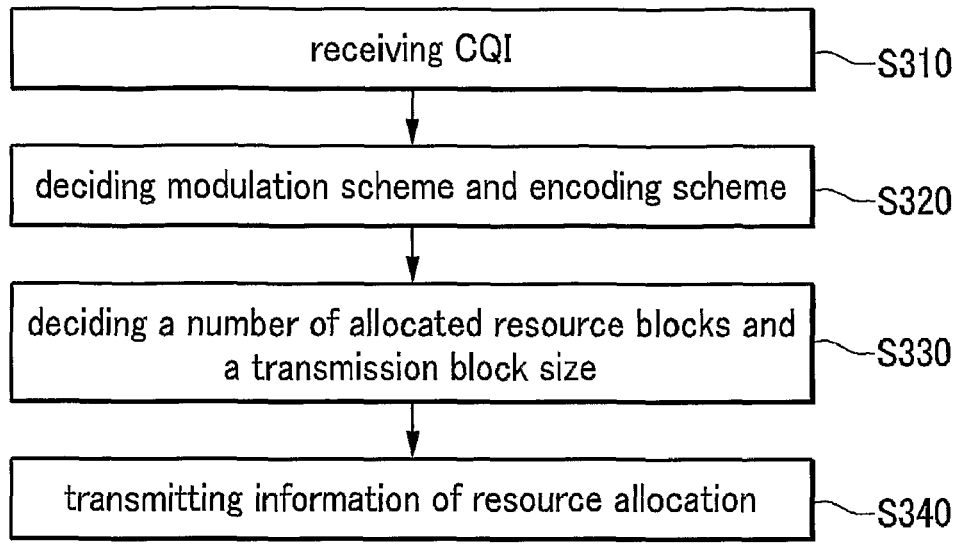
FIG. 3 is a flowchart of a method for resource allocation according to an exemplary embodiment of the present invention.

FIG. 3 is a flowchart of a method for resource allocation according to an exemplary embodiment of the present invention.

As shown in FIG. 3, the scheduler 210 receives CQI from the physical layer 220 (S310).

The CQI of downlink is what the physical layer 220 receives from a terminal, and CQI of uplink is what the physical layer 220 calculates.

The scheduler 210 decides on the modulation scheme and encoding scheme according to the received CQI, referring to regulations or a mapping table (S320).

The scheduler 210 decides on a number of allocated resource blocks and a transmission block size according to transmission data size, referring to a table of resource block allocation (S330).

That is, the scheduler 210 selects a number of allocated resource blocks corresponding to a minimum number of transmission bits that is more than the transmission data size plus the cyclic redundancy checking (CRC) size from a table of resource block allocation.

The scheduler 210 decides on the minimum number of transmission bits that is more than the transmission data size plus the cyclic redundancy checking (CRC) size as the transmission block size.

The scheduler 210 searches an ID corresponding to the decided-on transmission block size from a table of transmission block size.

The scheduler 210 transmits information of resource allocation to the physical layer 220 (S340).

The information of resource allocation includes the decided-on modulation scheme, encoding scheme, number of allocated resource blocks, and ID of the transmission block size.

Next, a method of allocation resources of downlink according to an exemplary embodiment of the present invention will be described referring to FIGS. 4 and 5.

Figure 4:
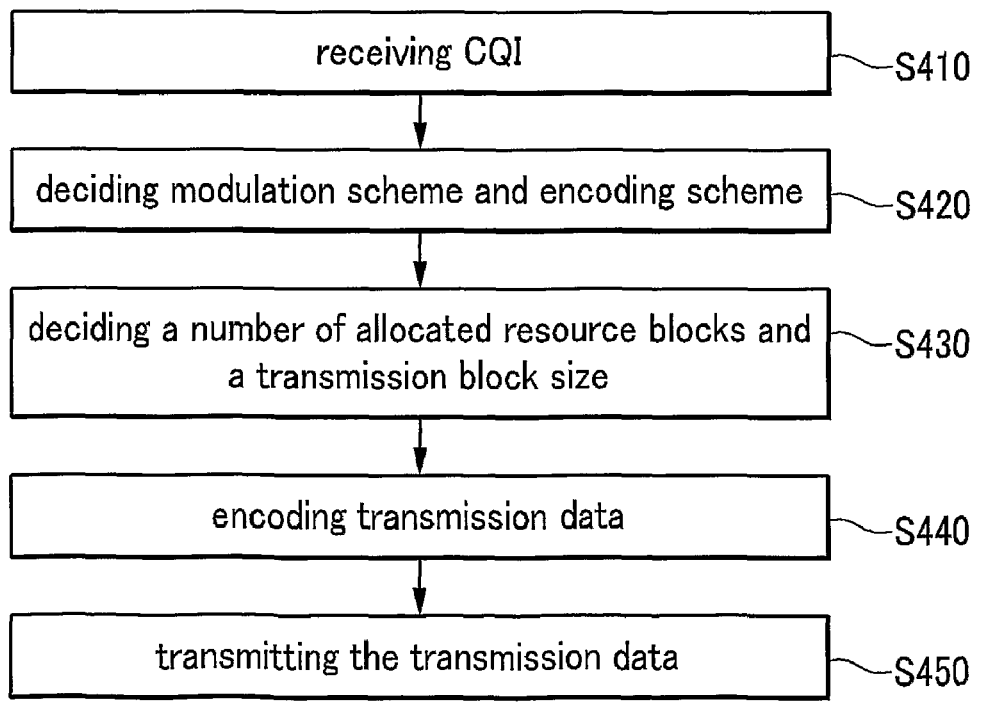
FIG. 4 is a flowchart of a method of allocation of downlink resources according to an exemplary embodiment of the present.

FIG. 4 is a flowchart of a method of allocation resources of downlink according to an exemplary embodiment of the present.

As shown in FIG. 4, a base station receives CQI of downlink from a terminal (S410), and decides on a modulation scheme and encoding scheme according to the CQI of downlink referring to regulations or a mapping table (S420).

The base station decides on a number of allocated resource blocks and a transmission block size according to transmission data size referring to a table of resource block allocation (S430).

That is, the base station selects a number of allocated resource blocks corresponding to a minimum number of transmission bits that is more than transmission data size plus the cyclic redundancy checking (CRC) size from a table of resource block allocation.

The base station decides on the minimum number of transmission bits that is more than the transmission data size plus the CRC size as the transmission block size.

The base station encodes transmission data according to the decided-on modulation scheme and encoding scheme (S440).

The encoding scheme process will be described referring to FIG. 5.

Figure 5:
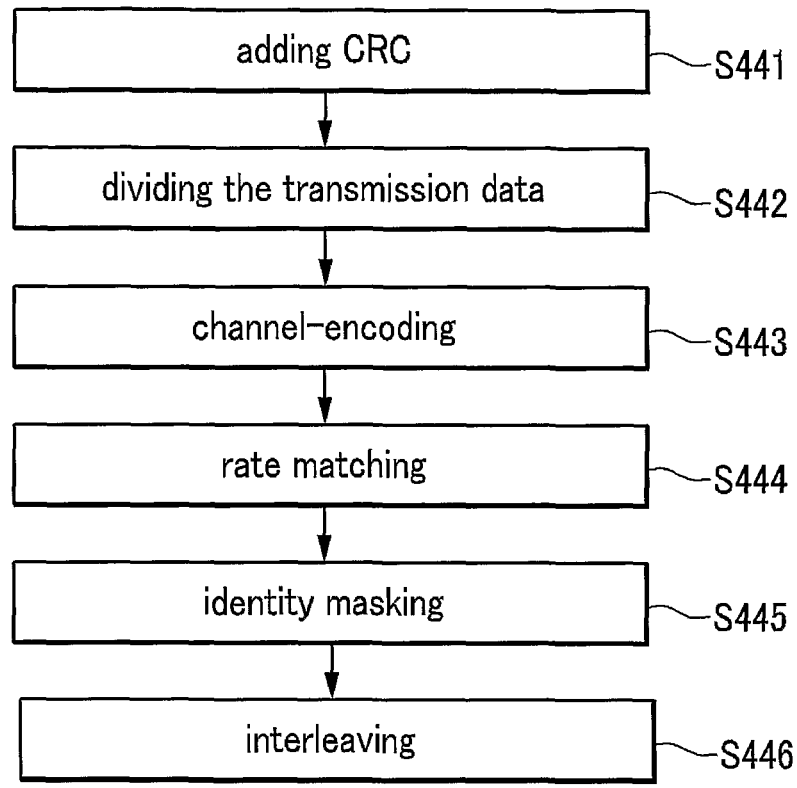
FIG. 5 is a flowchart of a transmission data encoding scheme process.

FIG. 5 is a flowchart of the transmission data encoding scheme process.

The base station adds CRC to the transmission data (S441).

The base station divides the transmission data to code blocks (S442).

The maximum length of a code block is 6144 bits, and the length of the code block must satisfy a condition.

That is, if the length of the code block is not less than 40 bits and not more than 512 bits, it should be a multiple of 8. If the length of the code block is more than 512 bits and not more than 1024 bits, it should be a multiple of 16. If the length of the code block is more than 1024 bits and not more than 2048 bits, it should be a multiple of 32. If the length of the code block is more than 2048 bits and not more than 6144 bits, it should be a multiple of 64.

The base station channel-encodes the divided data (S443).

There are convolutional encoding schemes with an encoding rate of ⅓, and a parallel concatenated convolutional code (PCCC) channel encoding scheme that has two encoders in a channel-encoding scheme.

The base station performs rate matching (S444).

That is, the base station matches the channel-encoded data to resource elements of a physical channel.

The base station performs identity masking (S445).

That is, when that the base station transmits on a public channel to only a specified terminal, the base station makes an identity of the specified terminal.

The base station performs interleaving (S446).

The interleaving is transmitted to the transmission data in a scattered fashion for preventing a series of error occurrences.

The base station encodes the transmission data and allocates resource blocks to the transmission data and transmits the transmission data (S450).

Next, a method of allocation an uplink resource according to an exemplary embodiment of the present invention will be described referring to FIG. 6.

Figure 6:
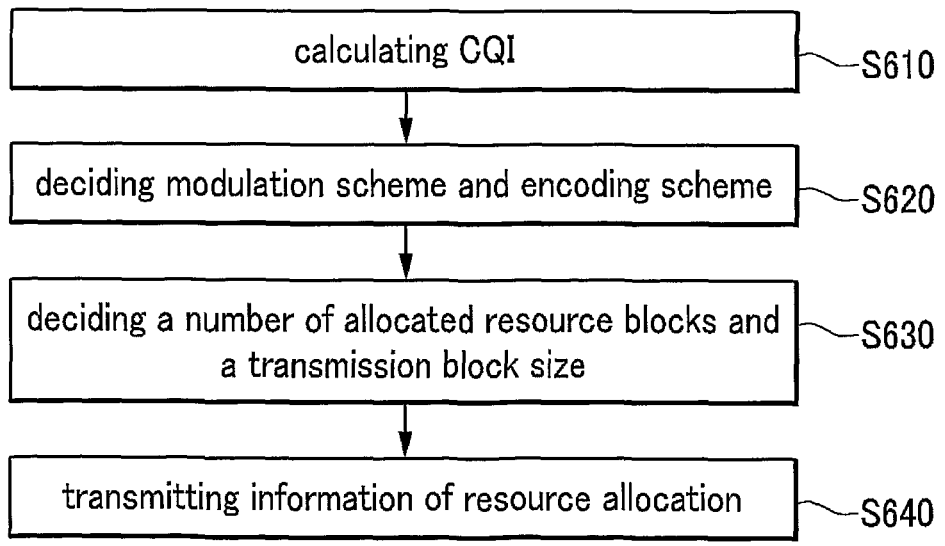
FIG. 6 is a flowchart of a method of allocation of uplink resources according to an exemplary embodiment of the present invention.

FIG. 6 is a flowchart of a method of allocation an uplink resource according to an exemplary embodiment of the present invention.

As shown in FIG. 6, a base station calculates CQI of the uplink (S610).

The base station decides on a modulation scheme and an encoding scheme according to the CQI of the uplink referring to regulations or a mapping table (S620).

The base station decides on a number of allocated resource blocks and a transmission block size according to the transmission data size referring to a table of resource block allocation (S630).

That is, the base station selects a number of allocated resource blocks corresponding to a minimum number of transmission bits that is more than the transmission data size plus a cyclic redundancy checking (CRC) size from a table of resource block allocation. The base station decides on the minimum number of transmission bits that is more than the transmission data size plus the cyclic redundancy checking (CRC) size as the transmission block size.

The base station searches an ID corresponding to the decided-on transmission block size from a table of transmission block size.

The base station transmits information on resource allocation to a terminal (S640).

The information on resource allocation includes the decided-on modulation scheme, the number of allocated resource blocks, and the ID of the transmission block size.

A terminal does not receive the decided-on encoding scheme, but calculates it by the received modulation scheme, the number of allocated resource blocks, and the ID of the transmission block size.

The exemplary embodiment of the present invention that has been described above may be implemented by not only an apparatus and a method, but also by a program that is capable of realizing a function corresponding to the structure according to the exemplary embodiment of the present invention and a recording medium having the program recorded therein. It can be understood by those skilled in the art that the implementation can be easily made from the above-described exemplary embodiment of the present invention.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

The invention claimed is:

1. A method for resource allocation of a scheduler of a base station in a wireless communication system, the method comprising:

deciding on a modulation scheme and an encoding scheme according to channel quality information (CQI) by the base station; and deciding on a number of allocated resource blocks according to transmission data size referring to a table of resource block allocation, wherein the table of resource block allocation presents a number of allocated resource blocks and a number of transmission bits according to the number of allocated resource blocks, wherein the number of transmission bits is a number of resource elements used for data transmission per resource block multiplied by a modulation rate, an encoding rate, and a number of allocated resource blocks;

the modulation rate depends on the modulation scheme and the encoding rate depends on the encoding scheme, and wherein if the number of transmission bits of the table of resource block allocation is not less than 40 bits and not more than 512 bits it should be a multiple of 8, if the number of transmission bits is more than 512 bits and not more than 1024 bits it should be a multiple of 16, if the number of transmission bits is more than 1024 bits and not more than 2048 bits it should be a multiple of 32, and if the number of transmission bits is more than 2048 bits and not more than 6144 bits it should be a multiple of 64.

2. The method of claim 1, wherein
the table of resource block allocation exists for each pair of a modulation scheme and an encoding scheme.

3. The method of claim 1, further comprising
transmitting information of resource allocation to a physical layer,
wherein the information of resource allocation comprises the decided-on modulation scheme, the decided-on encoding scheme, and the decided-on number of allocated resource blocks.

4. The method of claim 3, further comprising
searching ID corresponding to the decided-on number of allocated resource blocks from a table of transmission block size,
wherein the information of resource allocation comprises the ID, and the table of transmission block size presents the number of transmission bits and IDs corresponding to the number of transmission bits.

5. The method of claim 1, further comprising receiving the CQI from a physical layer.

6. A method for downlink resource allocation of a base station in a wireless communication system, the method comprising:
- deciding on a modulation scheme and an encoding scheme according to channel quality information (CQI) of downlink by the base station; and
- deciding on a number of allocated resource blocks according to size of transmission data referring to a table of downlink resource block allocation,
- wherein the table of downlink resource block allocation presents a number of allocated downlink resource blocks and a number of transmission bits according to the number of allocated downlink resource blocks,
- wherein the number of transmission bits is a number of resource elements used for data transmission per resource block multiplied by a modulation rate, an encoding rate, and the number of allocated resource blocks;
- the modulation rate depends on the modulation scheme and the encoding rate depends on the encoding scheme, and
- wherein if the number of transmission bits of the table of downlink resource block allocation is not less than 40 bits and not more than 512 bits it should be a multiple of 8, if the number of transmission bits is more than 512 bits and not more than 1024 bits it should be a multiple of 16, if the number of transmission bits is more than 1024 bits and not more than 2048 bits it should be a multiple of 32, and if the number of transmission bits is more than 2048 bits and not more than 6144 bits it should be a multiple of 64.

7. The method of claim 6, further comprising receiving the CQI of downlink from a terminal.

8. The method of claim 6, further comprising:
- encoding the transmission data according to the decided-on modulation scheme and the decided-on encoding scheme; and
- transmitting the encoded transmission data to a terminal.

9. The method of claim 8, wherein the encoding of the transmission data comprises:
- adding cyclic redundancy checking (CRC) to the transmission data;
- dividing the transmission data into code blocks; and
- encoding the divided transmission data.

* * * * *